(12) United States Patent
Kawai

(10) Patent No.: US 8,810,697 B2
(45) Date of Patent: Aug. 19, 2014

(54) IMAGE PICKUP APPARATUS, IMAGE PICKUP ELEMENT, AND METHOD FOR CORRECTING SENSITIVITY DIFFERENCE

(71) Applicant: FUJIFILM Corporation, Tokyo (JP)

(72) Inventor: Tomoyuki Kawai, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/152,315

(22) Filed: Jan. 10, 2014

(65) Prior Publication Data

US 2014/0125850 A1    May 8, 2014

Related U.S. Application Data

(63) Continuation of application No. PCT/JP2012/065832, filed on Jun. 21, 2012.

(30) Foreign Application Priority Data

Jul. 13, 2011    (JP) .................... 2011-155135

(51) Int. Cl.
*H04N 9/083*    (2006.01)
*H04N 5/335*    (2011.01)

(52) U.S. Cl.
USPC ..................... 348/290; 348/273; 348/277

(58) Field of Classification Search
None
See application file for complete search history.

(56) References Cited

U.S. PATENT DOCUMENTS

| | | | |
|---|---|---|---|
| 6,956,605 B1 | 10/2005 | Hashimoto | |
| 6,992,714 B1 | 1/2006 | Hashimoto et al. | |
| 7,643,072 B2 * | 1/2010 | Ashida et al. | 348/243 |
| 8,520,105 B2 * | 8/2013 | Funatsu et al. | 348/294 |
| 2006/0038904 A1 | 2/2006 | Kudoh | |
| 2006/0119724 A1 | 6/2006 | Inuiya | |
| 2006/0119726 A1 * | 6/2006 | Oda et al. | 348/315 |
| 2010/0230583 A1 | 9/2010 | Nakata et al. | |

FOREIGN PATENT DOCUMENTS

| | | |
|---|---|---|
| JP | 2000-059697 A | 2/2000 |
| JP | 2000-308080 A | 11/2000 |
| JP | 2001-292453 A | 10/2001 |
| JP | 2006-054276 A | 2/2006 |
| JP | 2006-165663 A | 6/2006 |
| JP | 2011-086888 A | 4/2011 |

OTHER PUBLICATIONS

International Search Report for PCT/JP2012/065832 dated Sep. 11, 2012.
Written Opinion of the International Searching Authority for PCT/JP2012/065832 dated Sep. 11, 2012.

* cited by examiner

*Primary Examiner* — Lin Ye
*Assistant Examiner* — Euel Cowan
(74) *Attorney, Agent, or Firm* — Birch, Stewart, Kolasch & Birch, LLP

(57) ABSTRACT

In an image pickup element, basic array patterns are repeatedly arranged in a horizontal direction and a vertical direction, each of the basic array patterns being made of I×J color filters, the color filters of each of three or more colors being arrayed in a mixed state, an arrangement cycle (I×J) of a basic array pattern is different from an arrangement cycle (2×2) of a sharing configuration pattern, the basic array pattern includes at least one same-color square array pattern which is made of 2×2 color filters of a same color respectively arranged on the 2×2 pixels of the sharing configuration pattern, a characteristic information storage unit stores information on sensitivity calculated from output values of the 2×2 pixels, and a control unit and a digital signal processing unit correct a sensitivity difference between all the pixels of the image pickup element with use of the information on the sensitivity.

25 Claims, 19 Drawing Sheets

IMAGE PICKUP APPARATUS, IMAGE PICKUP ELEMENT, AND METHOD FOR CORRECTING SENSITIVITY DIFFERENCE

This application is a continuation of PCT/JP2012/065832 filed on Jun. 21, 2012, which claims priority under 35 U.S.C. 119(a) to Patent Application No. 2011-155135 filed in Japan on Jul. 13, 2011, all which are hereby expressly incorporated by reference into the present application.

BACKGROUND OF THE INVENTION

1. Field of the Invention

The presently disclosed subject matter relates to an image pickup apparatus and an image pickup element configured to include a plurality of pixels that share a specific circuit element, and a method for correcting a sensitivity difference.

2. Description of the Related Art

An image pickup element made of a CMOS (complementary metal oxide semiconductor) is low in power consumption and is used for various kinds of portable image pickup apparatuses such as digital cameras and mobile phones.

In the CMOS image pickup element, a technology that a plurality of pixels share one amplifier is widely used as a technology for reducing a number of transistors necessary on a substrate (see Japanese Patent Application Laid-Open No. 2011-086888 and Japanese Patent Application Laid-Open No. 2006-054276).

A sharing configuration in which four pixels of 2×2 pixel arrangement share one amplifier is heavily used because the configuration is particularly well matched with the color filters arranged according to the Bayer array and also because an amplifier can be arranged at the center of four pixels and read gates for the respective pixels can be arranged around the pixels.

Further, Japanese Patent Application Laid-Open No. 2000-308080 discloses an image pickup element configured to employ a three-color random arrangement which satisfies an array restriction condition that an arbitrary target pixel should be adjacent to pixels of three colors including the color of the target pixel, on one of four sides of the target pixel.

SUMMARY OF THE INVENTION

However, in the configuration where color filters 94 were arranged on pixels 92 according to the Bayer array and four pixels 92 shared one amplifier 96 as illustrated in FIG. 18, a problem of deterioration in image reproducibility due to the amplifier-sharing configuration and a problem of deterioration in image reproducibility due to the color filter array being the Bayer array coexisted. This made it difficult to reliably correct sensitivity differences and to secure sufficient color reproducibility.

First, in the amplifier-sharing configuration, an output difference was generated even between the pixels 92 of the same color depending on positional relationship of the respective pixels 92, which share the amplifier 96, with the amplifier 96. In short, the pixels 92 different in position with respect to the amplifier 96 have varied sensitivity due to difference in layout of the substrate and the like, which caused a problem of an adverse effect being exerted on the image reproducibility. This problem had been exposed more as the pixel size became smaller.

Moreover, in the Bayer array, green (G) pixels were arranged in a checkered pattern (checkerboard pattern), and red (R) and blue (B) pixels were arranged in line sequence. Consequently, folding of a high-frequency signal the band of which was beyond reproduction bands of respective colors and a phase shift between the respective colors caused generation of low-frequency coloring (color moire).

For example, in a case where a monochrome vertically striped pattern (high-frequency image) as illustrated in a portion (A) of FIG. 19 is incident into an image pickup element in the Bayer array illustrated in a portion (B) of FIG. 19, if the image pickup element is divided by color according to the Bayer color array for comparison, R pixels form a flat light color image, B pixels form a flat dark color image, and G pixels form a mosaic-like dark and light color image as illustrated in portions (C) to (E) of FIG. 19. This indicates that a monochrome image, which does not normally have density difference (level difference) between RGB colors, is colored depending on color arrays and input frequencies.

Moreover, in a case where a monochrome slanting high-frequency image as illustrated in a portion (A) of FIG. 20 is incident into an image pickup element in the Bayer array illustrated in a portion (B) of FIG. 20, if the image pickup element is divided by color according to the Bayer color array for comparison, R and B pixels form flat light color images and G pixels form a flat dark color image as illustrated in portions (C) to (E) of FIG. 20. In this state, if the value of black is assumed to be 0 and the value of white is assumed to be 255, the monochrome slanting high-frequency image ends up green in color since only the G pixels have a value of 255. Thus, in the Bayer array, the slanting high-frequency image cannot correctly be reproduced.

Although the problem attributed to the amplifier-sharing configuration is described in Japanese Patent Application Laid-Open No. 2011-086888 and Japanese Patent Application Laid-Open No. 2006-054276, the problem attributed to the Bayer array are not mentioned at all, and any indication of a configuration that can provide easy solution to both the problems is not presented either. Moreover, although correction of sensitivity differences on the premise of the Bayer array is described, the described correction is in actuality not applicable to the cases of using color filter arrays other than the Bayer array. Further, since Japanese Patent Application Laid-Open No. 2011-086888 discloses only an adjustment means of hardware, the configuration described in Japanese Patent Application Laid-Open No. 2011-086888 has difficulty in coping with lens replacement, temporal change, and environmental variation. Japanese Patent Application Laid-Open No. 2006-054276 only presents a solution provided on the premise of the Bayer array and sharing by two pixels.

Moreover, in the conventional Bayer array, a repeating cycle (2×2) of the amplifier-sharing configuration is identical to a repeating cycle (2×2) of a basic color filter array (GB/RG), and therefore correction may simply be conducted in each of four positions. However, if the color filter array is randomized as described in Japanese Patent Application Laid-Open No. 2000-308080, a new problem that the sensitivity difference correction processing is complicated arises. In this regards, if the complicated processing is ventured to be executed, it is difficult to obtain reliable and sufficient color reproducibility due to the random nature of the color filter arrangement. Furthermore, there is another problem that synchronization processing is also complicated due to the random nature of the color filter arrangement.

Therefore, even though items stated in Japanese Patent Application Laid-Open No. 2011-086888, Japanese Patent Application Laid-Open No. 2006-054276 and Japanese Patent Application Laid-Open No. 2000-308080 are combined to fabricate a configuration which includes color filters of a random color array so as to detect and correct sensitivity differences between pixels of the same color, a problem of a processing load may arise, but it may still be difficult to provide sufficient color reproducibility in actuality.

The presently disclosed subject matter has been made in view of such circumstances, and it is an object of the presently disclosed subject matter to provide an image pickup apparatus, an image pickup element, and a method for correcting a sensitivity difference, which are capable of obtaining a high-definition image by correcting sensitivity differences, which are attributed to a configuration where a plurality of pixels share a specific circuit element, with a low load and at high precision and by realizing sufficient color reproducibility.

In order to accomplish the above object, the presently disclosed subject matter provides an image pickup apparatus, including: an image pickup element configured such that a plurality of color filters are respectively arranged on a plurality of pixels including photoelectric conversion elements that are two-dimensionally arrayed in a horizontal direction and a vertical direction; storage means configured to store information for correcting a sensitivity difference between the plurality of pixels of the image pickup element; and sensitivity difference correction means configured to correct the sensitivity difference between the plurality of pixels of the image pickup element with use of the information stored in the storage means, wherein the plurality of pixels of the image pickup element share a specific circuit element in units of 2×2 pixels, wherein the plurality of color filters of the image pickup element are configured such that basic array patterns are repeatedly arranged in the horizontal direction and the vertical direction, each of the basic array patterns being made of I×J color filters (I represents a number in the horizontal direction while J represents a number in the vertical direction), the color filters of each of three or more colors being arrayed in a mixed state in each of the basic array patterns, an arrangement cycle (I×J) of a basic array pattern is different from an arrangement cycle (2×2) of a sharing configuration pattern which is made of the specific circuit element and the 2×2 pixels, and the basic array pattern includes at least one same-color square array pattern which is made of 2×2 color filters respectively arranged on the 2×2 pixels of the sharing configuration pattern, the 2×2 color filters having a same color, wherein the storage means stores information on sensitivity of the 2×2 pixels corresponding to the same-color square array pattern, the sensitivity being calculated from output values of the 2×2 pixels corresponding to the same-color square array pattern, and wherein the sensitivity difference correction means corrects sensitivity differences of whole pixels corresponding to a picked-up image of the image pickup element with use of the information on the sensitivity of the 2×2 pixels corresponding to the same-color square array pattern stored in the storage means.

More specifically, the image pickup element is included, the image pickup element being formed from the basic array patterns of color filters being repeatedly arranged in the horizontal direction and the vertical direction, each of the basic array patterns of the color filters including at least one same-color square array pattern which is made of 2×2 color filters matched with the 2×2 pixels of the sharing configuration pattern that share a specific circuit element, the 2×2 color filters having a same color. The storage means and the sensitivity difference correction means are further included, the storage means being configured to store the information calculated from output values of the 2×2 pixels corresponding to the same-color square array pattern among I×J pixels corresponding to the basic array pattern, and the sensitivity difference correction means being configured to correct the sensitivity differences between all the pixels of the image pickup element with use of the information on the sensitivity of the 2×2 pixels corresponding to the same-color square array pattern stored in the storage means. Accordingly, it becomes possible to correct sensitivity differences, which are attributed to the configuration where a plurality of pixels shares a specific circuit element, by low load processing to secure color reproducibility, so that a high-definition image can be obtained.

In one aspect, detection means is included, the detection means configured to detect the information on the sensitivity from the output values of the 2×2 pixels corresponding to the same-color square array pattern, wherein the storage means stores the information on the sensitivity detected by the detection means. For example, when a coordinate position of a k-th pixel (k represents an integer from 1 to 4 that indicates a position with respect to the specific circuit element) in the 2×2 pixels corresponding to the same-color square array pattern in the image pickup element is defined as C[k], in a light irradiation state where the plurality of pixels of the image pickup element are irradiated with light, the detection means acquires an output value Data (C[1]) of a first pixel, an output value Data (C[2]) of a second pixel, an output value Data (C[3]) of a third pixel, and an output value Data (C[4]) of a fourth pixel for each of two or more basic array patterns, calculates an average S[k] of output values Data (C[k]) of each k-th pixel group across the two or more basic array patterns as sensitivity, and the detection means further calculates information indicating a ratio between an average S[1] of output values of a first pixel group, an average S[2] of output values of a second pixel group, an average S[3] of output values of a third pixel group, and an average S[4] of output values of a fourth pixel group, as the information on the sensitivity. That is, n the light irradiation state where the plurality of pixels of the image pickup element are irradiated with light, the detection means acquires an output value of each pixel at least in the 2×2 pixels corresponding to the same-color square array pattern among the I×J pixels corresponding to the basic array pattern, averages the output values of the respective 2×2 pixels across the plurality of same-color square array patterns at each of positions (upper left, upper right, lower left, and lower right) with respect to the specific circuit element, so as to obtain sensitivity of each pixel group (an upper left pixel group, upper right pixel group, lower left pixel group, and lower right pixel group) grouped per position with respect to the specific circuit element, and stores a ratio of sensitivity between these pixel groups as the information on the sensitivity. Therefore, since only the information corresponding to the number of positions with respect to the specific circuit element (2×2) needs to be stored, not only a storage capacity can be reduced but also a load of sensitivity detection processing becomes extremely low.

In one aspect, a photographic lens, opening/closing means and control means are included, the photographic lens configured to form an image of incident object light as an object image; the opening/closing means configured to open and close an optical path of the object light extending from the photographic lens to the image pickup element so as to switch the light shielding state and a light irradiation state of the image pickup element; and the control means configured to put the image pickup element in the light shielding state with the opening/closing means and to make the detection means detect the black level B[k] of the image pickup element, the control means configured to put the image pickup element in the light irradiation state with the opening/closing means and to make the detection means detect the sensitivity S[k] of the image pickup element.

In one aspect, when a power supply of the image pickup apparatus is turned on, the control means makes the detection means detect the black level in the light shielding state where the opening/closing means is closed, and the control means makes the opening/closing means open to switch a state of the image pickup element to the light irradiation state, sets the photographic lens in a defocus state, and makes the detection means detect the sensitivity. In other words, since characteristic information necessary for correcting sensitivity differences is detected when the power supply is turned on, appropriate correction of sensitivity differences can be implemented depending on temporal change and change in imaging environment of the image pickup element.

In one aspect, when a power supply of the image pickup apparatus is turned off, the control means sets the photographic lens in a defocus state in the light irradiation state where the opening/closing means is opened and makes the detection means detect the sensitivity, and the control means also puts the image pickup element in the light shielding state and makes the detection means detect the black level. More specifically, since characteristic information necessary for correcting sensitivity differences is detected when the power supply is turned off, sensitivity differences can be corrected, when the power supply is turned on, depending on temporal change without a time lag.

In one aspect, instruction input means is included, the instruction input means configured to receive an input of an imaging instruction, wherein the detection means detects the sensitivity based on the picked-up image picked up by the image pickup element in accordance with the imaging instruction. More specifically, since characteristic information necessary for correcting sensitivity differences is detected in normal imaging, appropriate correction of sensitivity differences can be implemented depending on change in imaging environment at the time of imaging.

In one aspect, the detection means calculates characteristic information by averaging output values of respective pixels (k-th pixels) in the 2×2 pixels corresponding to the same-color square array pattern in a plurality of pixels (k-th pixel group) which are in a same position with respect to the specific circuit element, the detection means averaging the output values of the pixels across a whole region corresponding to the picked-up image of the image pickup element. More specifically, since the sensitivity is detected by averaging the output values of the pixels across the whole region corresponding to the picked-up image, the sensitivity differences can be detected even when the image pickup element is irradiated not with uniform light but with object light.

In one aspect, the detection means calculates characteristic information by averaging output values of respective pixels (k-th pixels) in the 2×2 pixels corresponding to the same-color square array pattern in a plurality of pixels (k-th pixel group) which are in a same position with respect to the specific circuit element, the detection means dividing a whole region corresponding to the picked-up image of the image pickup element and averaging the output values of the pixels in each of division areas. That since the sensitivity is detected by averaging the output values of the pixels in each of the division areas, it becomes possible to cope with surface shading generated depending on a circuit layout of the image pickup element.

The presently disclosed subject matter provides an image pickup element configured such that a plurality of color filters are respectively arranged on a plurality of pixels including photoelectric conversion elements that are two-dimensionally arrayed in a horizontal direction and a vertical direction, wherein the plurality of pixels share a specific circuit element in units of 2×2 pixels, wherein the plurality of color filters are configured such that basic array patterns are repeatedly arranged in the horizontal direction and the vertical direction, each of the basic array patterns being made of I×J color filters (I represents a number in the horizontal direction while J represents a number in the vertical direction), the color filters of each of three or more colors being arrayed in a mixed state in each of the basic array patterns, an arrangement cycle (I×J) of a basic array pattern is different from an arrangement cycle (2×2) of a sharing configuration pattern which is made of the specific circuit element and the 2×2 pixels, and the basic array pattern includes at least one same-color square array pattern which is made of 2×2 color filters respectively arranged on the 2×2 pixels of the sharing configuration pattern, the 2×2 color filters having a same color.

The presently disclosed subject matter also provides a method for correcting a sensitivity difference for an image pickup element configured such that a plurality of color filters are respectively arranged on a plurality of pixels including photoelectric conversion elements that are two-dimensionally arrayed in a horizontal direction and a vertical direction, wherein the plurality of pixels of the image pickup element share a specific circuit element in units of 2×2 pixels, wherein the plurality of color filters of the image pickup element are formed from basic array patterns repeatedly arranged in the horizontal direction and the vertical direction, each of the basic array patterns being made of I×J color filters (I represents a number in the horizontal direction while J represents a number of in the vertical direction), the color filters of each of three or more colors being arrayed in a mixed state in each of the basic array patterns, an arrangement cycle (I×J) of a basic array pattern is different from an arrangement cycle (2×2) of a sharing configuration pattern which is made of the specific circuit element and the 2×2 pixels, and the basic array pattern includes at least one same-color square array pattern which is made of 2×2 color filters respectively arranged on the 2×2 pixels of the sharing configuration pattern, the 2×2 color filters having a same color, the method including: prestoring information on sensitivity of the 2×2 pixels corresponding to the same-color square array pattern, the information on the sensitivity being calculated from output values of the 2×2 pixels corresponding to the same-color square array pattern; and correcting a sensitivity difference between pixels in the I×J pixels corresponding to the basic array pattern in all the pixels of the image pickup element with use of the information on the sensitivity of the 2×2 pixels corresponding to the same-color square array pattern stored in the storage device.

According to the presently disclosed subject matter, it becomes possible to obtain a high-definition image by correcting sensitivity differences, which are attributed to the configuration where a plurality of pixels share a specific circuit element, with a low load and at high precision and by realizing sufficient color reproducibility.

DETAILED DESCRIPTION OF EXEMPLARY EMBODIMENTS

Hereinafter, embodiments of the presently disclosed subject matter are described in detail with reference to the accompanying drawings.

[Overall Configuration of Image Pickup Apparatus]

Figure 1:
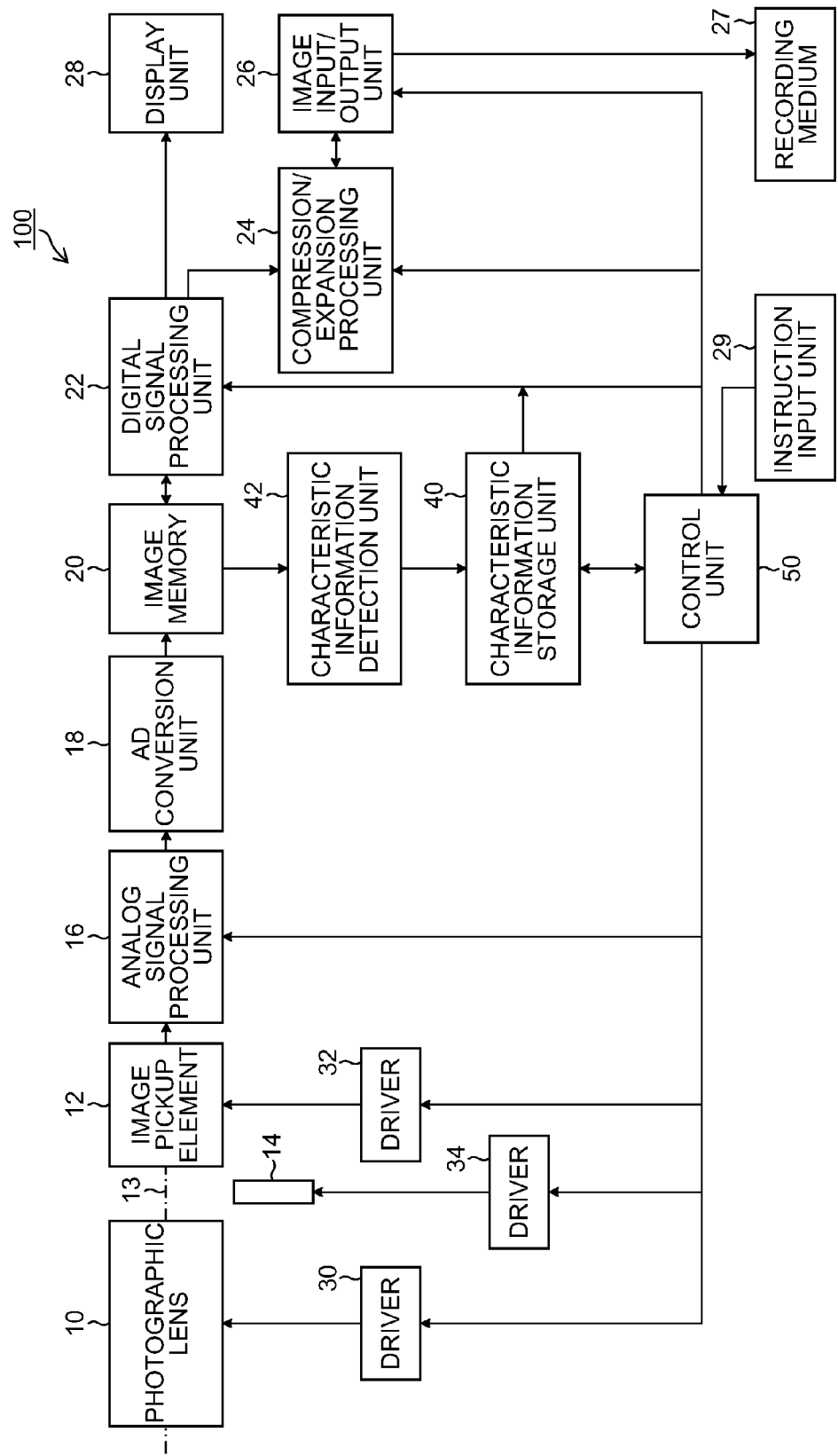
FIG. 1 is a block diagram illustrating an overall configuration of one example of an image pickup apparatus according to the presently disclosed subject matter.

FIG. 1 is a block diagram illustrating an overall configuration of one example of an image pickup apparatus according to the presently disclosed subject matter. Herein, the image pickup apparatus is not limited to a single camera unit, but may include various kinds of information devices and electronic equipment, such as camera-equipped mobile phones, camera-equipped smartphones, camera-equipped tablet computers, and camera-equipped music players.

An image pickup apparatus 100 includes a photographic lens 10 configured to form an image of incident object light as an object image, an image pickup element 12 configured to pick up an object image formed with the photographic lens 10, a mechanical shutter 14 (opening/closing means) configured to open and close an optical path 13 of the object light extending from the photographic lens 10 to the image pickup element 12 so as to switch a light shielding state and a light irradiation state of the image pickup element 12, an analog signal processing unit 16 configured to perform a specified analog signal processing on an analog image signal outputted from the image pickup element 12, an AD conversion unit 18 configured to convert the analog image signal outputted from the analog signal processing unit 16 into a digital image signal, an image memory 20 configured to temporarily store the digital image signal, a digital signal processing unit 22 configured to perform a specified digital signal processing on the digital image signal temporarily stored in the image memory 20, a compression/expansion processing unit 24 configured to perform a compression processing and an expansion processing on the digital image signal, an image input/output unit 26 configured to input and output digital image data, a recording medium 27 configured to record the compressed digital image signal as a picked-up image via the image input/output unit 26, a display unit 28 configured to display the digital image signal as the picked-up image, an instruction input unit 29 configured to receive an input of various kinds of instructions, a driver 30 configured to drive the photographic lens 10, a driver 32 configured to drive the image pickup element 12, and a driver 34 configured to drive the mechanical shutter 14.

Figure 2:
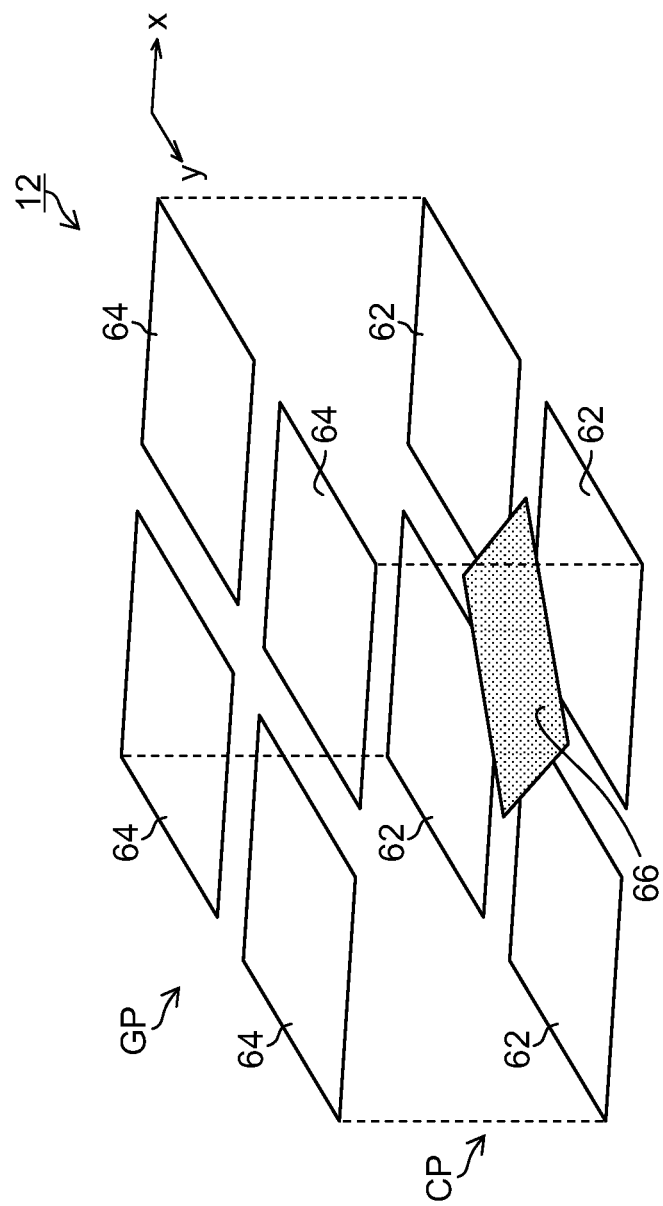
FIG. 2 is a schematic view illustrating a part of an image pickup element.

The image pickup element 12 is made of a CMOS (complementary metal oxide semiconductor) image pickup element. The configuration of specific 2×2 pixels, which are a part of the image pickup element 12, is schematically illustrated in FIG. 2. In the image pickup element 12, a plurality of pixels 62 made of photoelectric conversion elements are two-dimensionally arrayed in a horizontal direction x and a vertical direction y, a plurality of color filters 64 respectively arranged on the pixels. Further, the plurality of pixels 62 share, in units of 2×2 pixels, an amplifier 66 (amplifying element) used as a specific circuit element. The plurality of color filters 64 are formed from 6×6-pixel basic array patterns BP repeatedly arranged in the horizontal direction x and the vertical direction y, each of the basic array patterns BP having color filters in respective three or more colors (R, G, B three colors in this example) arrayed in a mixed state. The basic array pattern includes at least one same-color square array pattern which is made of 2×2 color filters respectively corresponding to the 2×2 pixels of the sharing configuration pattern, the 2×2 color filters having a same color (G in this example). The basic array pattern BP is described in detail later.

An object image formed on the image pickup element 12 with the photographic lens 10 is converted into signal charges corresponding to an amount of incident light by the photoelectric conversion elements that constitute the pixels 62 of the image pickup element 12. Based on a driving pulse given from the driver 32 in accordance with a command of the control unit 50, the signal charges stored in the respective photoelectric conversion elements are read from the image pickup element 12 one by one as a voltage signal (image signal) corresponding to the amount of the signal charges. The image signals read from the image pickup element 12 are R, G, and B image signals corresponding to the color filter array of the image pickup element 12.

The analog image signals read from the image pickup element 12 are subjected to analog signal processing performed by the analog signal processing unit 16, and then are converted to digital image signals by the AD conversion unit 18, and the digital image signals are temporarily stored in the image memory 20. The temporarily stored digital image signals are subjected to various kinds of digital signal processing, such as sensitivity difference correction, white balance correction, gamma correction, generation of a luminance signal and a color-difference signal, contour correction, and color correction performed by the digital signal processing unit 22. The image signals subjected to such digital signal processing are then subjected to compression processing, in conformity with the JPEG standard and the like, by the compression/expansion processing unit 24, and are recorded on the recording media 27, such as a memory card, by the image input/output unit 26. The digital image signals are also outputted to be displayed on the display unit 28, such as an LCD monitor.

The image pickup apparatus 100 also includes a characteristic information storage unit 40 configured to store information (characteristic information) for correcting a sensitivity difference between a plurality of pixels across a whole effective pixel region of the image pickup element 12, a characteristic information detection unit 42 configured to detect the characteristic information, and a control unit 50 configured to control each unit of the image pickup apparatus 100. In a light irradiation state where the plurality of pixels of the image pickup element 12 are irradiated with light, the characteristic information detection unit 42 detects as sensitivity an output value of each pixel at least in the 2×2 pixels corresponding to the same-color square array pattern among the I×J pixels corresponding to the basic array pattern. In a light shielding state where the plurality of pixels of the image pickup element are shielded from light, the characteristic information detection unit 42 detects as a black level an output value of each pixel in the 2×2 pixels that form a sharing configuration pattern CP among the I×J pixels corresponding to the basic array pattern BP.

The characteristic information storage unit 40 of this example is made of a nonvolatile memory. As the characteristic information for correcting sensitivity differences, the characteristic information storage unit 40 stores characteristic information for correcting sensitivity differences between pixels attributed to sharing the amplifier 66, the characteristic information being relating only to the 2×2 pixels corresponding to the same-color square array pattern GP among the I×J pixels corresponding to the basic array pattern BP illustrated in FIG. 3.

The control unit 50 controls black level detection and sensitivity detection of the image pickup element 12. In the black level detection control, the control unit 50 closes (shields) the optical path 13 with the mechanical shutter 14 to so as to put the image pickup element 12 in the light shielding state, makes the characteristic information detection unit 42 detect a black level of each pixel corresponding to the same-color square array pattern GP of the image pickup element 12, and stores the black level of each of these pixels in the characteristic information storage unit 40. In the sensitivity detection control, the control unit 50 opens (releases) the optical path 13 with the mechanical shutter 14 so as to put the image pickup element 12 in the light irradiation state, makes the characteristic information detection unit 42 detect sensitivity of each pixel corresponding to the same-color square array pattern GP of the image pickup element 12, and stores the sensitivity of each of these pixels in the characteristic information storage unit 40. The control unit 50 then calculates a correction value for each of the I×J pixels corresponding to the basic array pattern BP based on the sensitivity and the black level of each of the 2×2 pixels corresponding to the same-color square array pattern GP.

The control unit 50 also makes the digital signal processing unit 22 (sensitivity difference correction means) correct sensitivity differences between the plurality of pixels across the whole effective pixel region of the image pickup element 12 with use of the characteristic information for correcting sensitivity differences stored in the characteristic information storage unit 40. More specifically, by using the characteristic information relating only to the 2×2-pixels corresponding to the same-color square array pattern GP among the I×J pixels corresponding to the basic array pattern BP illustrated in FIG. 3, the digital signal processing unit 22 corrects the sensitivity differences between pixels in the I×J pixels corresponding to the basic array pattern BP across the whole effective pixel region of the image pickup element 12. It is to be noted that the proof of sensitivity difference correction is described in detail later.

[Basic Configuration of Color Filter Array]

Figure 3:
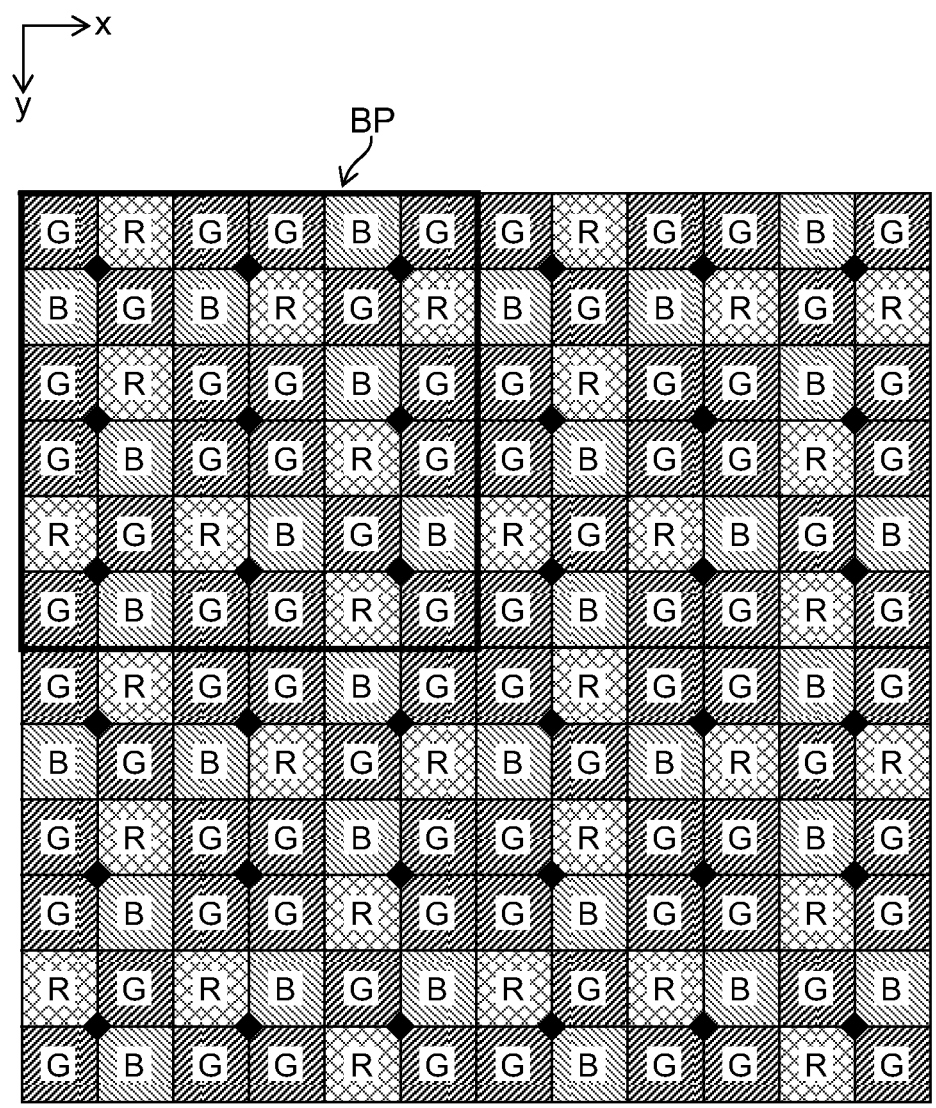
FIG. 3 is a view illustrating one example of a color filter array of the image pickup element.

FIG. 3 illustrates one example of an array of the color filters 64 (hereinafter referred to as a "color filter array") provided in the image pickup element 12. Any one of the color filters of three primary colors which are red (R), green (G) and blue (B) are arranged on the respective pixels.

Note that although the pixels 62 made of photoelectric conversion elements are covered with the color filters 64 and the amplifier 66 is also covered with and hidden by the color filters 64, the amplifier 66 is illustrated as a see-through image in FIG. 3 so that the configuration to share the amplifier 66 can be identified.

The color filter array illustrated in FIG. 3 has the following first to third characteristics.

(First Characteristic)

The color filter array illustrated in FIG. 3 is formed by repeatedly arranging basic array patterns BP (patterns illustrated with a thick frame) in the horizontal direction x and in the vertical direction y, each of the patterns BP having color filters 64 in each three colors (R, G, and B) which are arrayed as a square array (six filters in the horizontal direction and six filters in the vertical direction in the present example) in a mixed state. That E, the color filter array is formed from the filters of the respective colors of R, G, and B (R filter, G filter, B filter) being arrayed with specified cyclicity.

Thus, the R filters, the G filters, and the B filters are arrayed with specified cyclicity, and therefore when processing such as synchronization (interpolation) processing (also referred to as demosaicing) of R, G, and B signals read from the image pickup element is executed, the processing can be executed in accordance with the repeated pattern.

(Second Characteristic)

As compared with the arrangement cycle (2×2) of the sharing configuration CP including the amplifier 66 and 2×2 pixels, the arrangement cycle (6×6) of the basic array pattern BP is three times larger both in the horizontal direction x and the vertical direction y. The basic array pattern BP includes at least one same-color square array pattern GP which is made of 2×2 color filters 64 respectively corresponding to the 2×2 pixels of the amplifier-sharing configuration pattern (sharing square array pattern), the 2×2 color filters having a same color. That E, the basic array pattern BP includes 2×2 color filters (color filters of the same-color square array pattern GP) which are matched in position with the 2×2 pixels of the amplifier-sharing configuration both in the horizontal direction x and the vertical direction y.

Thus, since the basic array pattern BP includes color filters of the same-color square array pattern GP which are matched in position with the 2×2 pixels of the sharing configuration both in the horizontal direction x and the vertical direction y, sensitivity differences attributed to the amplifier-sharing configuration can easily be detected based on output values of the 2×2 pixels corresponding to the same-color square array pattern GP.

[Principles of Detection and Correction of Sensitivity Differences]

Next, principles of detection and correction of sensitivity differences between pixels, which are attributed to the amplifier-sharing configuration, are described with reference to FIGS. 4, 5 and 6.

Figure 4:
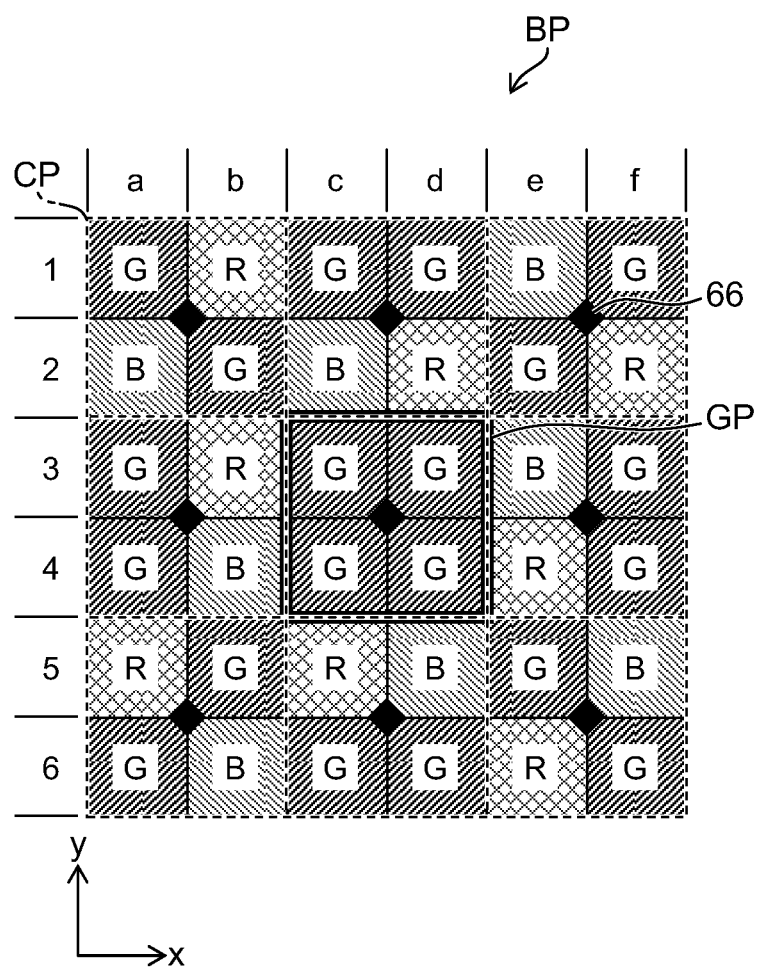
FIG. 4 is a view illustrating one example of a basic array pattern.

FIG. 4 illustrates one basic array pattern BP. Since color filters and pixels (photoelectric conversion elements) are arranged in one-to-one relation, it can be said that FIG. 4 illustrates 6×6 pixels corresponding to one basic array pattern BP. In short, if "G" pixels are viewed as pixels with a green (G) color filter, "R" pixels as pixels with a red (R) color filter, and "B" pixels as pixels with a blue (B) color filter in FIG. 4, the basic configuration of the image pickup element 12 which mainly includes pixels 62, color filters 64, and amplifiers 66 can easily be understood.

Moreover, in the drawing, reference numerals 1 to 6 that designate arrangement positions in the vertical direction y are attached to the left-hand side of the basic array pattern BP, and reference characters a to f that designate arrangement positions in the horizontal direction x are attached to the upper side. Since all the pixels designated by the reference character "G" (a-1, c-1, d-1, b-2, e-2 . . . etc.) are equipped with a color filter of a same color (G), they are expected to have uniform (same) sensitivity and uniform (same) black levels. Similarly, since all the pixels designated by the reference character "R" (b-1, d-2, f-2, b-3, e-4 . . . etc.) are equipped with a color filter of a same color (R), they are expected to have uniform sensitivity and uniform black levels. Similarly, since all the pixels designated by the reference character "B" (e-1, a-2, c-2, e-3, b-4 . . . etc.) are equipped with a color filter of a same color (B), they are expected to have uniform sensitivity and uniform black levels.

However, the actual image pickup element 12 is configured so that four pixels of 2×2-pixel arrangement share one amplifier 66 as illustrated with a broken line in the drawing. Since pixels of the same color (for example, a-1 and b-2) are different in configuration (layout) in accordance with positional relationship (upper left, upper right, lower left, lower right) with respect to the amplifier 66, minute characteristic differences are generated even between the pixels of the same color. In short, due to minute output differences (sensitivity differences) generated between pixels of the same color, which should essentially output the same output values, geometric noise with cyclic patterns may be generated on a picked-up image.

As one method for correcting such minute characteristic differences, it can be considered to execute detection and correction of the characteristic differences, as is executable in CMOS image sensors of the conventional Bayer array, by dividing the whole pixel group into four pixel groups (an upper left pixel group, an upper right pixel group, a lower left pixel group, and a lower right pixel group) in accordance with positional relationship (upper left, upper right, lower left, lower right) with respect to the amplifier 66. However, in the color filter array formed from the basic array patterns BP repeatedly arranged as illustrated in FIG. 3, it is difficult to divide the pixels into four pixel groups and to execute detection and correction of characteristic differences therein. Particularly, appropriate values of the sensitivity differences cannot be obtained by dividing the pixels into four groups and averaging sensitivity values in each of these pixel groups. In other words, in the conventional Bayer array, all the sharing configuration patterns CP are the same in the arrangement of R, G, and B color filters and in the mixture ratio of respective colors, while in the color filter array of FIG. 3, the arrangement of R, G, and B color filters and the mixture ratio of respective colors are different between the respective sharing configuration patterns CP. Accordingly, appropriate detection and correction of sensitivity differences cannot be executed unless the whole pixel group is divided into 6×6=36 pixel groups, the number of which is equal to the number of the arrayed basic array patterns BP. This not only increases a storage capacity of necessary characteristic information but also causes a problem of an increased detection and correction processing loads.

Accordingly, in the presently disclosed subject matter, a configuration is employed as illustrated in FIGS. 2 to 4, in which the basic array pattern BP includes at least one same-color square array pattern GP which is made of 2×2 color filters 64 respectively arranged on the 2×2 pixels of the sharing configuration pattern CP, the 2×2 color filters having a same color. Moreover, attention is paid only to four pixels (c-2, d-3, c-4, d-4 of FIG. 4) corresponding to the same-color square array pattern GP, and an average of the sensitivity and an average of the black levels are calculated as characteristic information in each of four pixel groups corresponding to these four pixels. It is to be noted that "sensitivity difference" can be expressed as a ratio (or difference) in sensitivity between pixels.

Figure 5:
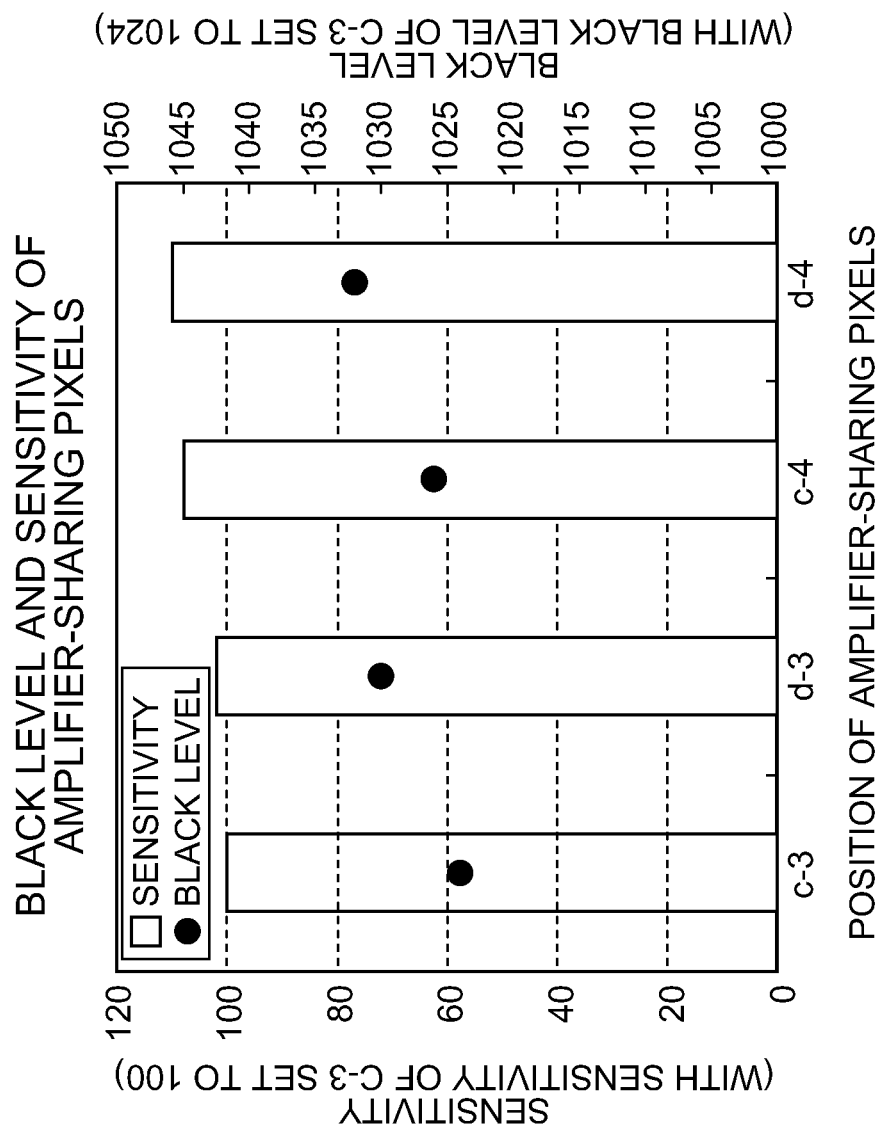
FIG. 5 is a view illustrating one example of a black level and sensitivity of amplifier-sharing pixels.

FIG. 5 illustrates one example of the sensitivity and the black level in the amplifier-sharing pixels in one sharing configuration pattern CP corresponding to one same-color square array pattern GP. In FIG. 5, sensitivity differences between four pixels (c-3, d-3, c-4, and d-4) are relative values with the sensitivity of a pixel at a specific position (c-3) as a reference ("100"). Similarly, black level differences between four pixels are relative values with the black value of the pixel at the specific position (c-3) as a reference ("1024"). Thus, attention is paid to the characteristic information on the four pixels of the same-color square array pattern GP.

Figure 6:
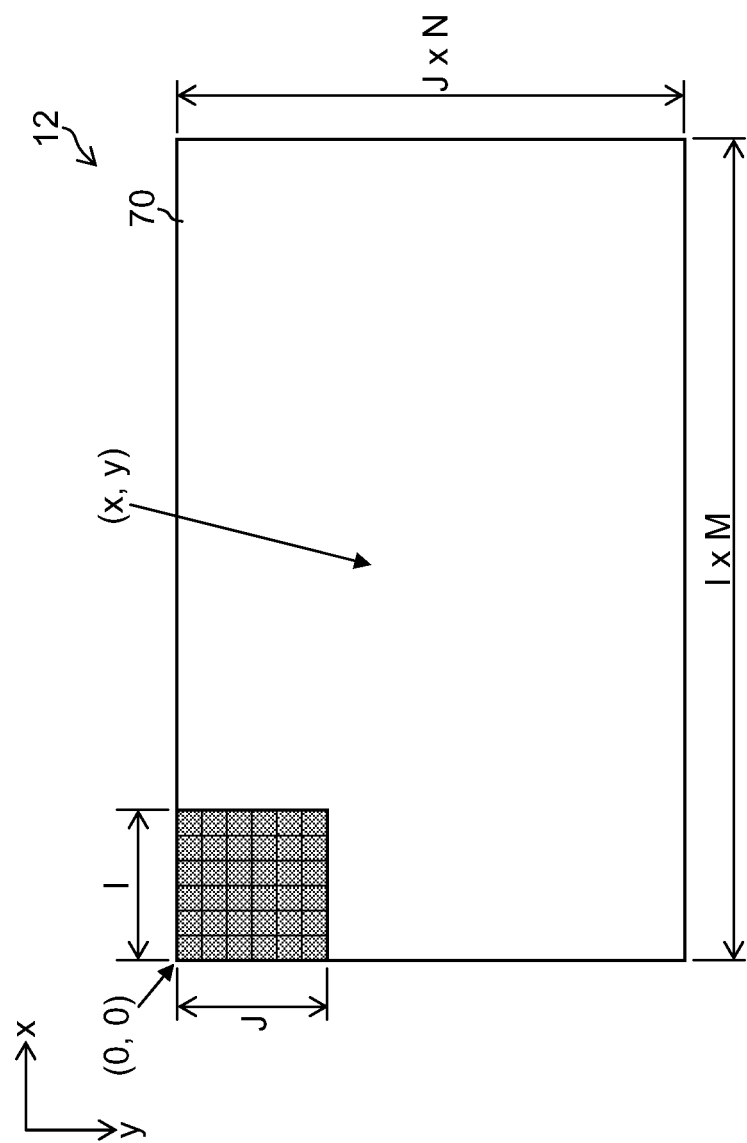
FIG. 6 is a view illustrating an effective pixel region of the image pickup element.

FIG. 6 illustrates a whole effective pixel region 70 of the image pickup element 12. Among the whole region where the pixels 62 of the image pickup element 12 are formed, the effective pixel region 70 is a region in which an image signal can be outputted and sensitivity difference correction is guaranteed. In this example, among a valid pixel region (a region where an image signal can be outputted) of the image pickup element 12, a region the number of pixels ((I×M)×(J×N) pixels) of which corresponds to the number of pixels of the basic array pattern BP (the number of pixels I in the horizontal direction x and the number of pixels J in the vertical direction) and the number of repetitions of the basic array pattern BP (the number of repetitions M in the horizontal direction x and the number of repetitions N in the vertical direction y) is defined as the effective pixel region 70.

The upper left point of the effective pixel region 70 is defined as an origin (0, 0), m represents an integer from 0 to (M−1), and n represents an integer from 0 to (N−1). With the position of the amplifier 66 as a reference, c-3 pixels are defined as upper left pixels (first pixels), d-3 pixels are defined as upper right pixels (second pixels), c-4 pixels are defined as lower left pixels (third pixels), and d-4 pixels are defined as lower right pixels (fourth pixels). Accordingly, for example, an average of the sensitivity (output values of pixels in the light irradiation state) of the N×M upper left pixels (first pixel group) is calculated. Similarly, an average of the sensitivity of the N×M upper right pixels (second pixel group) is calculated. Similarly, an average of the sensitivity of the N×M lower left pixels (third pixel group) is calculated. Similarly, an average of the sensitivity of the N×M lower right pixels (fourth pixel group) is calculated. In other words, average sensitivity is calculated in each of four pixel groups.

As for the black levels (output values of pixels in the light shielding state), an average black level is calculated in each of four pixel groups as in the case of the sensitivity.

As described in the foregoing, in the presently disclosed subject matter, the basic array pattern BP includes at least one same-color square array pattern GP made of 2×2 color filters of a same color corresponding to the sharing configuration pattern CP. As a consequence, the respective 2×2 pixels corresponding only to the same-color square array pattern GP among the basic array patterns BP are divided into four pixel groups, so that the sensitivity differences can be detected and corrected with sufficient precision. In other words, the sensitivity differences attributed to the sharing configuration of the amplifier 66 can be detected and corrected with ease and precision.

[Basic Illustrative Example of Detection and Correction of Sensitivity Differences]

Next, a basic example of detection and correction of sensitivity differences attributed to the sharing configuration is described.

In the effective pixel region 70 of the image pickup element 12 illustrated in FIG. 6, the horizontal direction is defined as x, the vertical direction is defined as y, and an upper left point is defined as an origin (0, 0). Moreover, the number of repetitions of the basic array pattern BP (made of I×J color filters) in the horizontal direction x is defined as M, the number of repetitions in the vertical direction y is defined as N, and indices indicating each of the basic array patterns BP in M×N basic array patterns BP are defined as m and n (m is an integer from 0 to M−1, and n is an integer from 0 to N−1). Further, relative coordinates of an upper left pixel (reference pixel) of the same-color square array pattern GP, with upper left coordinates (I×m, I×n) of the basic array pattern BP as a reference, are defined as (a, b). In this case, a coordinate position C[k] of a k-th pixel (k is an integer from 1 to 4) in the amplifier-sharing same-color 2×2 pixels corresponding to the same-color square array pattern GP in each of the basic array patterns BP is expressed with a following formula:

Coordinate C[1] of first pixel(upper left pixel)=(I×m+ a,J×n+b),

Coordinate C[2] of second pixel(upper right pixel)= (I×m+a+1,J×n+b),

Coordinate C[3] of third pixel(lower left pixel)=(I×m+ a,J×n+b+1), and

Coordinate C[4] of fourth pixel(lower right pixel)= (I×m+a+1,J×n+b+1).

In the basic array pattern BP of FIG. 4, I=J=6 and a=b=2, and so the coordinate position C[k] of the k-th pixel is expressed as the following formula in actuality:

Coordinate C[1] of first pixel(upper left pixel)=(6×m+ 2,6×n+2),

Coordinate C[2] of second pixel(upper right pixel)= (6×m+3,6×n+2),

Coordinate C[3] of third pixel(lower left pixel)= (6×m+2,6×n+3), and

Coordinate C[4] of fourth pixel(lower right pixel)= (6×m+3,6×n+3).

A description is now given of one example of sensitivity detection by the characteristic information detection unit 42.

An output value of the k-th pixel in the state (light irradiation state) where at least the effective pixel region 70 of the image pickup element 12 is irradiated with uniform light is defined as Data (C[k]).

The characteristic information detection unit 42 acquires, in the light irradiation state, a first pixel output value Data (C[1]), a second pixel output value Data (C[2]), a third pixel output value Data (C[3]), and a fourth pixel output value Data (C[4]) at least in each of two or more M×N basic array patterns BP from the image memory 20, and calculates an average S[k] of output values Data (C[k]) of each k-th pixel group across the two or more basic array patterns BP as sensitivity.

For example, sensitivity when output values are averaged across the M×N basic array patterns BP is as follows:

Sensitivity S[1] of first pixel group=ΣData(6×m+2,6× n+2)/(M×N),

Sensitivity S[2] of second pixel group=ΣData(6×m+ 3,6×n+2)/(M×N),

Sensitivity S[3] of third pixel group=ΣData(6×m+2,6× n+3)/(M×N), and

Sensitivity S[4] of fourth pixel group=ΣData(6×m+ 3,6×n+3)/(M×N).

Herein, Σ indicates that an output value Data (x, y) is integrated with m being varied from 0 to M−1 and n being varied from 0 to N−1. Note that although the case of averaging the output values in the M×N patterns has been described, it is not necessary to average the output levels of all the M×N patterns.

Thus, in the light irradiation state where the plurality of pixels of the image pickup element are irradiated with light, the characteristic information detection unit 42 detects as sensitivity an average of the output values of each pixel in the 2×2 pixels corresponding to the same-color square array pattern GP among the I×J pixels corresponding to the basic array pattern BP.

The characteristic information detection unit 42 extracts a maximum Smax from among the sensitivity S[1] to S[4], and calculates a compensation gain Gain[k]=Smax/S[k] corresponding to an output value Data (CC[k]) of each of the 2×2 pixels that form the sharing configuration pattern CP. The compensation gain Gain[k] is as illustrated in the following formula:

Compensation gain of first pixel Gain[1]= Smax/S[1],

Compensation gain of second pixel Gain[2]= Smax/S[2],

Compensation gain of third pixel Gain[3]= Smax/S[3], and

Compensation gain of fourth pixel Gain[4]= Smax/S[4].

Note that the number of repetitions of the sharing configuration pattern CP in the horizontal direction x in the effective pixel region 70 illustrated in FIG. 6 is defined as G, the number of repetitions of the sharing configuration pattern CP in the vertical direction y is defined as H, indices that indicate each of the sharing configuration patterns CP among G×H sharing configuration patterns CP are defined as g and h (g is an integer from 0 to G−1, and h is an integer from 0 to H−1). Coordinates CC[k] of the k-th pixel (k is an integer from 1 to 4) in the 2×2 pixels that form each sharing configuration pattern CP are as illustrated in a following formula:

Coordinate of first pixel(upper left pixel)CC[1]= (2×g,2×h),

Coordinate of second pixel(upper right pixel)CC[2](2× g+1,2×h),

Coordinate of third pixel(lower left pixel)CC[3]=(2× g,2×h+1), and

Coordinate of fourth pixel(lower right pixel)CC[4]= (2×g+1,2×h+1).

Thus, based on the output values of only the 2×2 pixels corresponding to the same-color square array pattern GP among the I×J pixels corresponding to the basic array pattern BP during uniform light irradiation, the characteristic information detection unit 42 calculates compensation gains Gain [1] to [4] for correcting the output values Data (x, y) of the respective pixels in the whole effective pixel region 70 during imaging.

A description is now given of one example of black level detection by the characteristic information detection unit 42.

In the effective pixel region 70 illustrated in FIG. 6, the number of repetitions of the sharing configuration pattern CP in the horizontal direction x is defined as G, the number of repetitions of the sharing configuration pattern CP in the vertical direction y is defined as H, indices that indicate each of the sharing configuration patterns in the G×H sharing configuration patterns CP are defined as g and h (g is an integer from 0 to G−1, and h is an integer from 0 to H−1), and an output value of the k-th pixel in each of the sharing configuration patterns CP when the image pickup element 12 is put in the light shielding state is defined as BData (CC[k]).

In the light shielding state where at least the effective pixel region 70 of the image pickup element 12 is shielded from light, the characteristic information detection unit 42 acquires, in each of two or more sharing configuration patterns CP among the G×H sharing configuration patterns CP, a first pixel output value BData (CC[1]), a second pixel output value BData (CC[2]), a third pixel output value BData (CC[3]), and a fourth pixel output value BData (CC[4]), and calculates an average B[k] of the output values of each k-th pixel group across the two or more sharing configuration patterns CP. For example, an average B[k] of the output values in the G×H sharing configuration patterns CP is as follows:

First pixel group average $B[1]=\Sigma K(2 \times g+2, 2 \times h+2)/(G \times H)$, Second pixel group average $B[2]=\Sigma K(2 \times g+3, 2 \times h+2)/(G \times H)$, Third pixel group average $B[3]=\Sigma K(2 \times g+2, 2 \times h+3)/(G \times H)$, and Fourth pixel group average $B[4]=\Sigma K(2 \times g+3, 2 \times h+3)/(G \times H)$.

Herein, sigma indicates that an output value BData (x, y) is integrated with g being varied from 0 to G−1 and h being varied from 0 to H−1. Note that although the case of averaging the black levels in G×H patterns has been described, it is not necessary to average the black levels of all the G×H patterns.

Thus, in the light shielding state where at least the effective pixel region 70 is shielded from light, the characteristic information detection unit 42 detects as a black level an average of the output values of the respective pixels in the 2×2 pixels that form the sharing configuration pattern CP among the I×J pixels corresponding to the basic array pattern BP.

A description is now given of one example of sensitivity difference correction by the control unit 50 and the digital signal processing unit 22.

The control unit 50 makes the digital signal processing unit 22 calculate Data' (CC[k])=Data (CC[k])−B[k]×Gain[k].

Here, k represents an integer of 1 to 4, Data (CC[k]) represents an uncorrected output value of the k-th pixel in each of the sharing configuration patterns CP in the effective pixel region 70, and Data' (CC[k]) represents a corrected output value of the k-th pixel in each of the sharing configuration patterns CP in the effective pixel region 70.

In this way, the control unit 50 makes the digital signal processing unit 22 correct sensitivity differences between pixels in I×J pixels corresponding to each of the basic array patterns BP, in each of the basic array patterns BP in the whole effective pixel region 70, with use of the characteristic information only on the 2×2 pixels corresponding to the same-color square array pattern GP.

[Example of Sensitivity Difference Correction Processing with Characteristic Information being Prestored]

Figure 7:
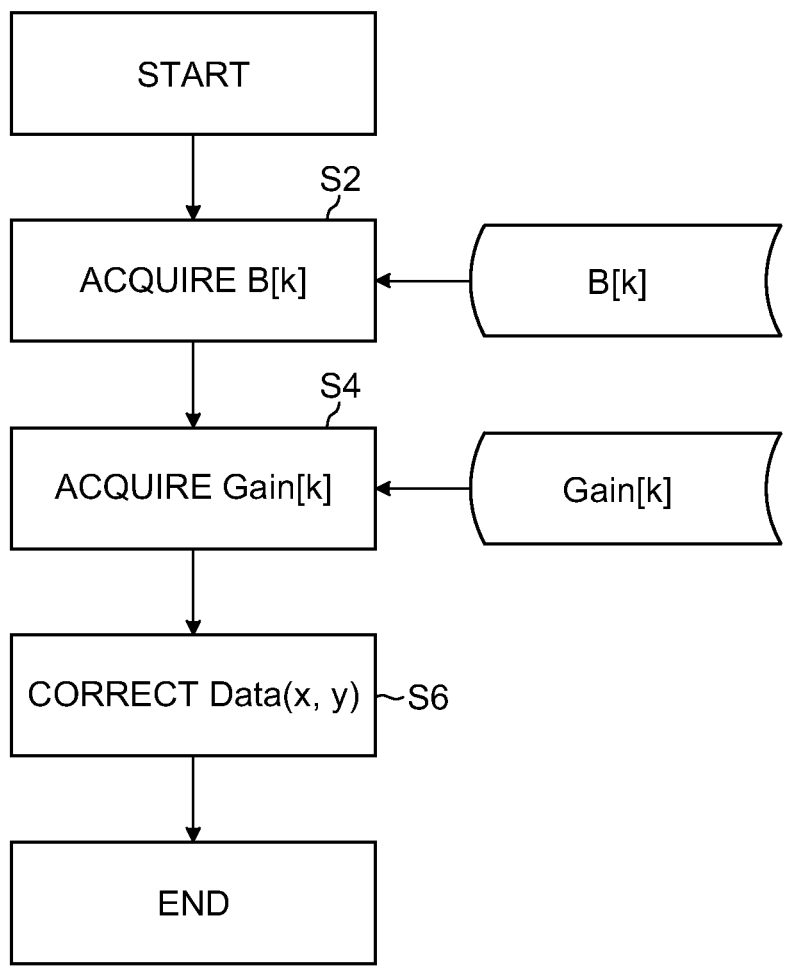
FIG. 7 is a flow chart illustrating a flow of an example of sensitivity difference correction processing.

FIG. 7 is an outlined flow chart illustrating a flow of an example of sensitivity difference correction processing. This processing is executed in accordance with a program under the control of the control unit 50 of FIG. 1.

Note that the characteristic information (compensation gain Gain[k] and black level average B[k]) indicating the sensitivity differences between only the 2×2 pixels of the same color corresponding to the same-color square array pattern GP of the image pickup element 12 is prestored in the characteristic information storage unit 40.

The sensitivity difference correction processing from steps S2 to S6 may be executed at any time. For example, the processing may be executed in imaging processing when an imaging instruction is inputted into the instruction input unit 29, and may be executed by reading a picked-up image stored in the recording medium 27.

First, a black level average B[k] is acquired from the characteristic information storage unit 40 (step S2). Here, k represents an integer of 1 to 4. That is, B[k] is a numeric value that indicates the black level of each pixel (k-th pixel) in the 2×2 pixels corresponding to the same-color square array pattern GP. In this example, B[k] is an average of the black levels across the plurality of basic array patterns BP (a black level average of the k-th pixel group).

Next, a compensation gain Gain[k] is acquired from the characteristic information storage unit 40 (step S4). Here, k represents an integer of 1 to 4. That is, Gain[k] is a numeric value indicating sensitivity differences between pixels in the 2×2 pixels corresponding to the same-color square array pattern GP and is also a correction coefficient for correcting sensitivity differences between pixels of each of the sharing configuration patterns CP in each of the basic array patterns BP in the whole effective pixel region of the image pickup element 12.

Next, by using the compensation gain Gain[k] and the black level average B[k], an output value Data (x, y) of each pixel in the whole effective pixel region of the image pickup element 12 is corrected. Here, k represents an integer of 1 to 4, and (x, y) represent xy coordinates of each pixel in the whole effective pixel region of the image pickup element 12 illustrated in FIG. 6.

Thus, in this example, by measuring and storing the compensation gain Gain[k] and the black level average B[k] in advance, the processing time in sensitivity difference correction can be shortened and the sensitivity difference correction processing can be simplified. Further, since accurate measurement can be performed beforehand in preferable measurement environments, correction accuracy can be enhanced.

[First Example of Characteristic Detection Processing]

Figure 8:
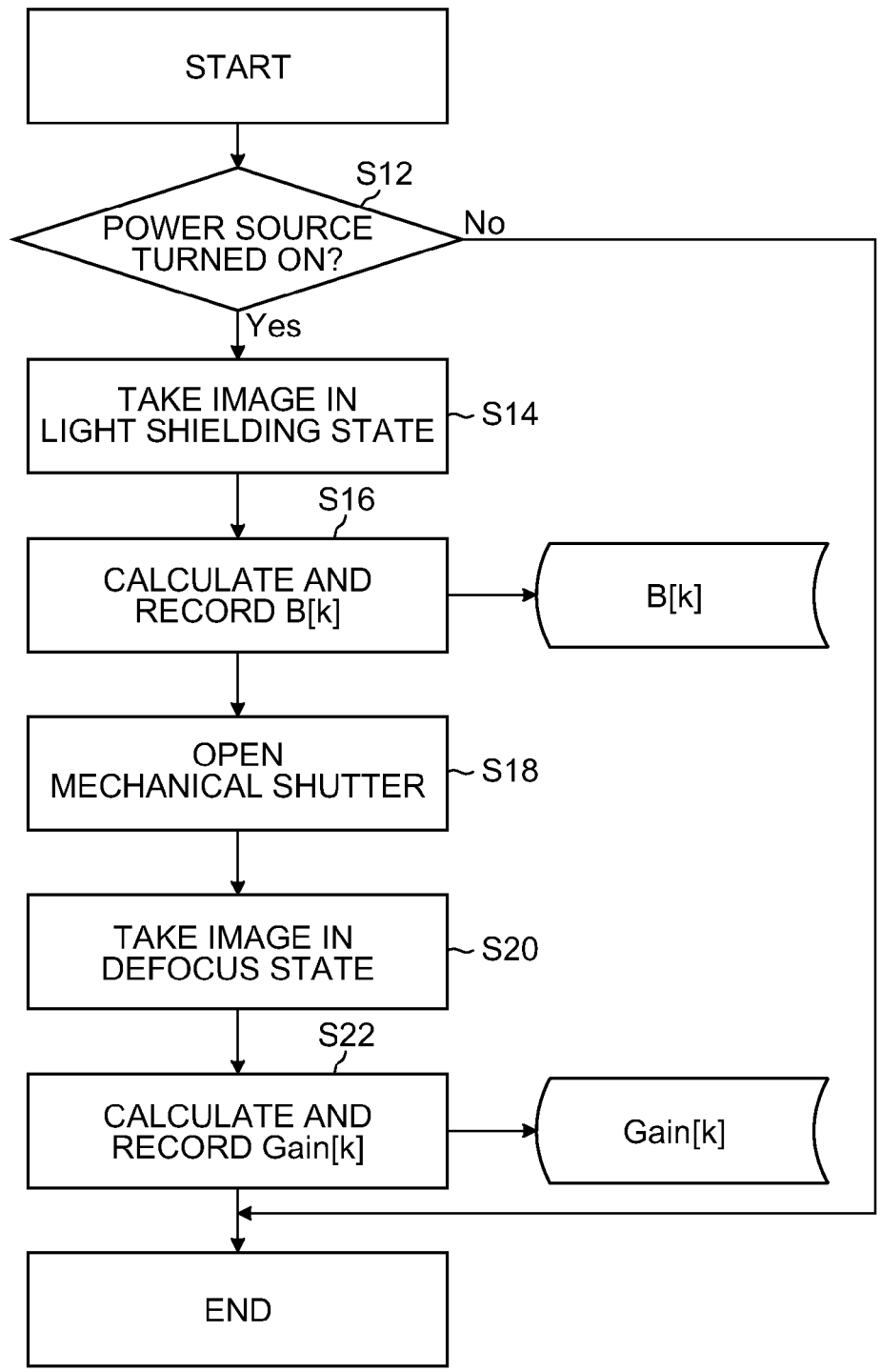
FIG. 8 is a flow chart illustrating a flow of a first example of characteristic detection processing.

FIG. 8 is an outlined flow chart illustrating a flow of a first example of characteristic detection processing. This processing is executed in accordance with a program under the control of the control unit 50 of FIG. 1.

It is determined whether or not a power supply of the image pickup apparatus 100 is turned on (step S12). If the power supply is turned on, characteristic detection processing (steps S14 to 22) is executed.

Note that the mechanical shutter 14 is already closed and the image pickup element 12 is in the light shielding state.

The mechanical shutter 14 is closed to put the image pickup element 12 in the light shielding state, in which image pickup (light shielding image taking) is performed (step S14). An output value of each pixel only in the 2×2 pixels corresponding to the same-color square array pattern GP among the I×J pixels corresponding to the basic array pattern BP is detected as a black level, and an average B[k] of the black levels across the plurality of basic array patterns BP is calculated and stored in the characteristic information storage unit 40 (step S16).

The mechanical shutter 14 is opened to put the image pickup element 12 in the light irradiation state (step S18). At the same time, the photographic lens 10 is put in a defocus state and image pickup (defocus exposure image taking) is performed (step S20). An output value of each pixel only in the 2×2 pixels corresponding to the same-color square array pattern GP among the I×J pixels corresponding to the basic array pattern BP is detected, and a compensation gain G[k] is calculated and stored in the characteristic information storage unit 40 (step S22).

Note that when an imaging instruction is inputted into the instruction input unit 29, sensitivity differences between pixels in the I×J pixels corresponding to the basic array pattern BP are corrected in every basic array pattern BP with use of the information (B[k] and Gain[k]) stored in the characteristic information storage unit 40 as described with reference to FIG. 7.

Thus, in the first example of the characteristic detection processing, the compensation gain Gain[k] and the black level average B[k] are measured and stored every time the power supply of the image pickup apparatus 100 is turned on, so that the information in consideration of temporal change in characteristics and imaging environments (temperature and lens for use in imaging) can be acquired.

[Second Example of Characteristic Detection Processing]

Figure 9:
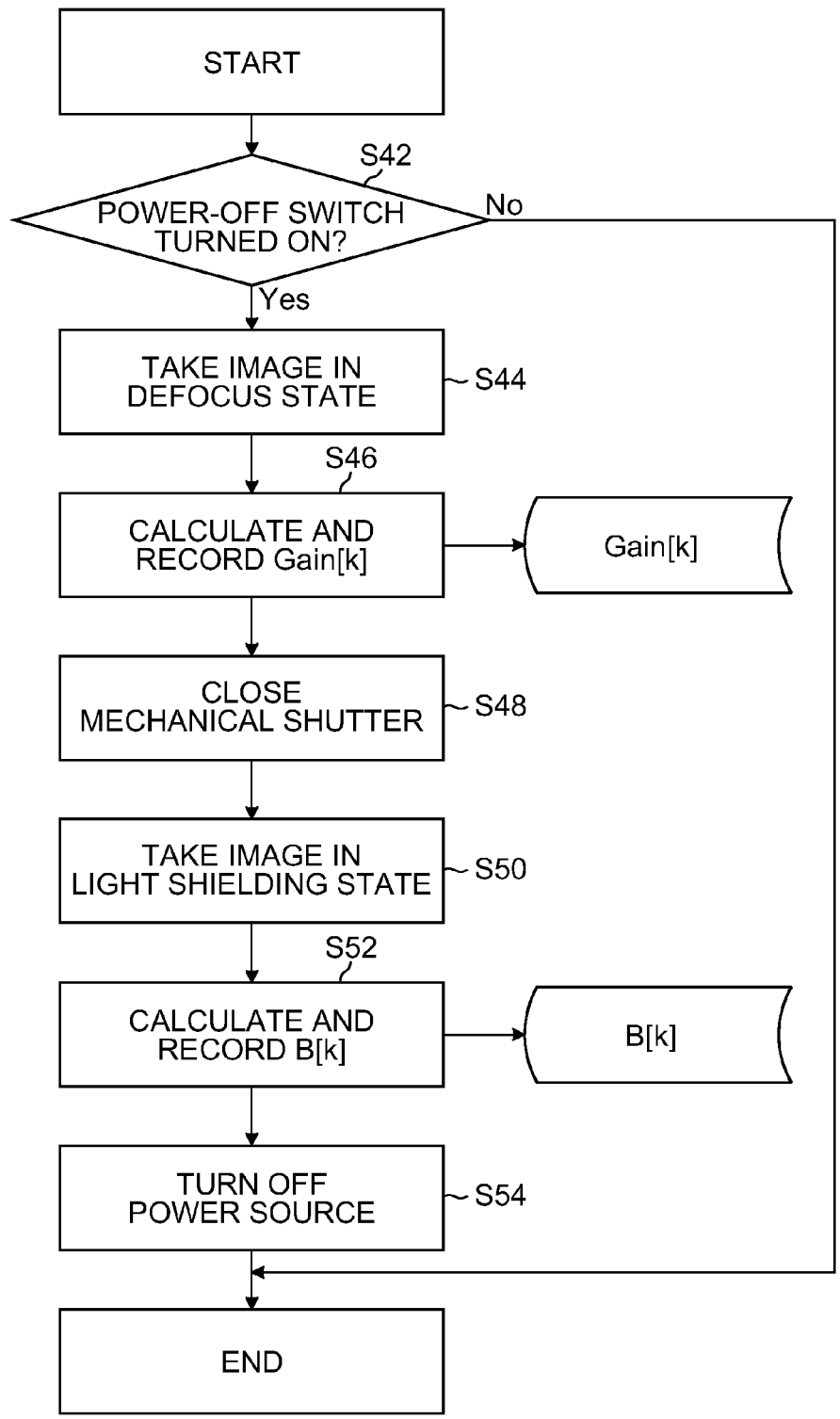
FIG. 9 is a flow chart illustrating a flow of a second example of the characteristic detection processing.

FIG. 9 is an outlined flow chart illustrating a flow of a second example of characteristic detection processing. This processing is executed in accordance with a program under the control of the control unit 50 of FIG. 1.

It is determined whether or not a power-off switch is turned on, i.e., whether or not a power-off instruction is inputted into the instruction input unit 29 of the image pickup apparatus 100 (step S42). If the power-off instruction is inputted, the characteristic detection processing (steps S14 to 54) is executed.

It is to be noted that the mechanical shutter 14 is already opened and the image pickup element 12 is in the light irradiation state.

The photographic lens 10 is put in the defocus state and image pickup (defocus exposure image taking) is performed (step S44). An output value of each pixel only in the 2×2 pixels corresponding to the same-color square array pattern GP among the I×J pixels corresponding to the basic array pattern BP is detected, and a compensation gain G[k] is calculated and stored in the characteristic information storage unit 40 (step S46).

The mechanical shutter 14 is closed to put the image pickup element 12 in the light shielding state (step S48) and image pickup (shielding image taking) is performed (step S50). An output value of each pixel only in the 2×2 pixels corresponding to the same-color square array pattern GP among I×J pixels corresponding to the basic array pattern BP is detected as a black level, and an average B[k] of the black levels across the plurality of basic array patterns BP is calculated and stored in the characteristic information storage unit 40 (step S52). Then, the power supply of the image pickup apparatus 100 is turned off (step S54).

Thus, in the second example of the characteristic detection processing, the black level average B[k] and the compensation gain Gain[k] are detected and stored in the storage device when the power supply of the image pickup apparatus 100 is turned off.

Then, when the power supply of the image pickup apparatus 100 is turned on and an imaging instruction is inputted into the instruction input unit 29, sensitivity differences between pixels in the I×J pixels corresponding to the basic array pattern BP are corrected in every basic array pattern BP with use of the information (B[k] and Gain[k]) stored in the characteristic information storage unit 40 as described with reference to FIG. 7.

In the second example of the characteristic detection processing, the compensation gain Gain[k] and the black level average B[k] are measured every time the power supply of the image pickup apparatus 100 is turned off. Accordingly, as compared with the case where measurement is performed every time the power supply is turned on as in the first example, increase in time taken for enabling image to be taken from the power-on state can be eliminated.

[Example in which Characteristic Detection Processing and Sensitivity Difference Correction Processing are Executed During Normal Imaging]

Figure 10:
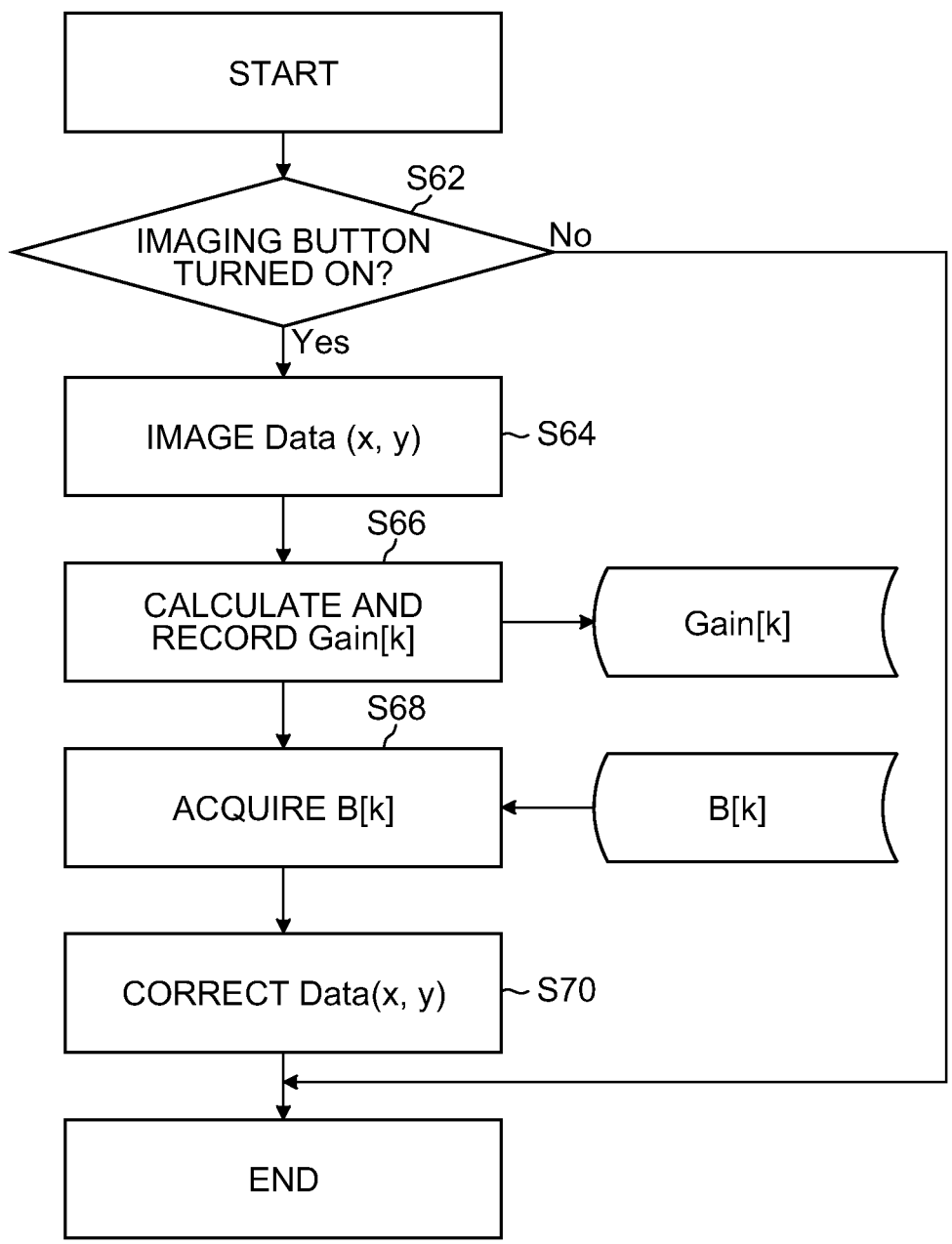
FIG. 10 is a flow chart illustrating a flow of an example in which the characteristic detection processing and the sensitivity difference correction processing are executed during normal imaging.

FIG. 10 is an outlined flow chart illustrating a flow of an example in which the characteristic detection processing and the sensitivity difference correction processing are executed during normal imaging. This processing is executed in accordance with a program under the control of the control unit 50 of FIG. 1.

It is to be noted that the power supply of the image pickup apparatus 100 is already turned on, and the mechanical shutter 14 is already closed (the image pickup element 12 is in the light shielding state).

It is determined whether or not an imaging button is inputted, i.e., whether or not an imaging instruction is inputted (step S62). If the imaging instruction is inputted, characteristic detection processing (steps S64 to 68) is executed.

Image pickup (defocus exposure image taking) is performed in the state where the photographic lens is focused on an object (step S64). An output value of each pixel only in the 2×2 pixels corresponding to the same-color square array pattern GP among the I×J pixels corresponding to the basic array pattern BP is detected, and a compensation gain G[k] is calculated and stored in the characteristic information storage unit 40 (step S66).

A black level average B[k] is acquired from the characteristic information storage unit 40 (step S68).

An output value Data (x, y) is corrected (step S70).

Note that although the case of executing the characteristic detection processing upon input of the imaging instruction has been described with reference to FIG. 10, characteristic detection may be performed in accordance with not only the imaging instruction but also an instruction from a user.

[Characteristic Information Detection Region]

A description is now given of a detection region of characteristic information.

First, a case where a compensation gain is calculated by using an average of the whole screen is described.

Figure 11:
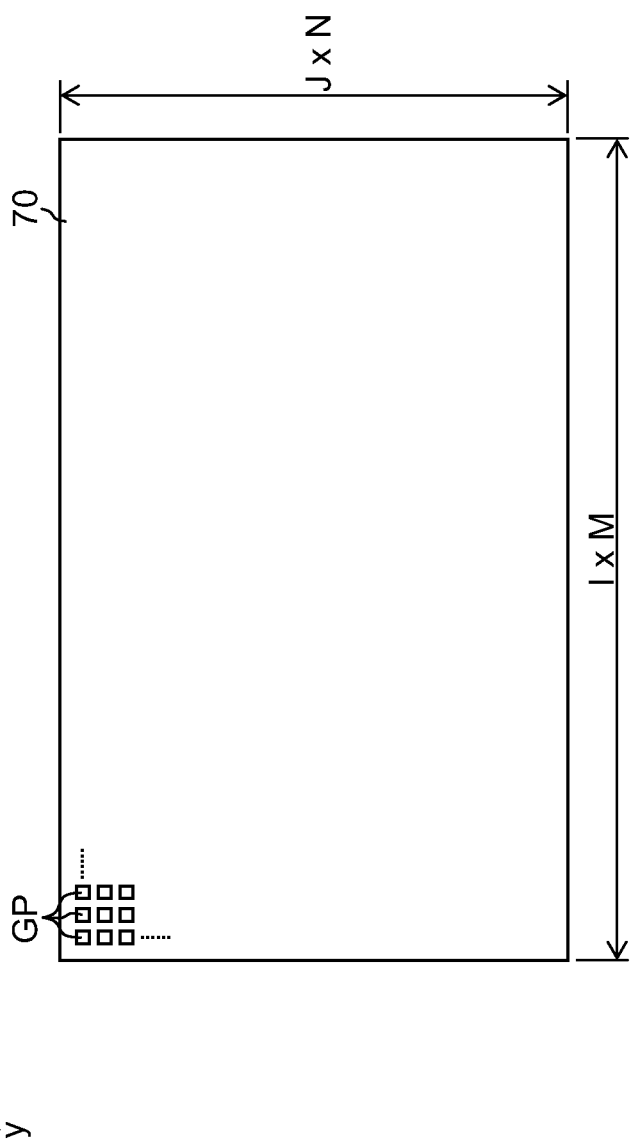
FIG. 11 is an explanatory view to be used for describing a case of calculating a compensation gain with use of an average value of output values of a whole screen.

When the characteristic information detection unit 42 calculates the compensation gain Gain[k] by averaging output values of respective pixels (k-th pixels) in the 2×2 pixels corresponding to the same-color square array pattern GP in each of a plurality of pixels (each k-th pixel group) which are same in the position with respect to the amplifier 66, output values of the pixels are averaged across the whole effective pixel region 70 of the image pickup element 12 as illustrated in FIG. 11. In short, sensitivity S[k] is calculated by averaging the output values of the k-th pixel in the light irradiation state across the whole effective pixel region 70, and with use of the sensitivity S[k], the compensation gain Gain[k](=Smax/S[k]) is calculated.

Next, a description is given of a case where the whole screen is divided into a plurality of areas, and the compensation gain is calculated in each of these areas.

Figure 12:
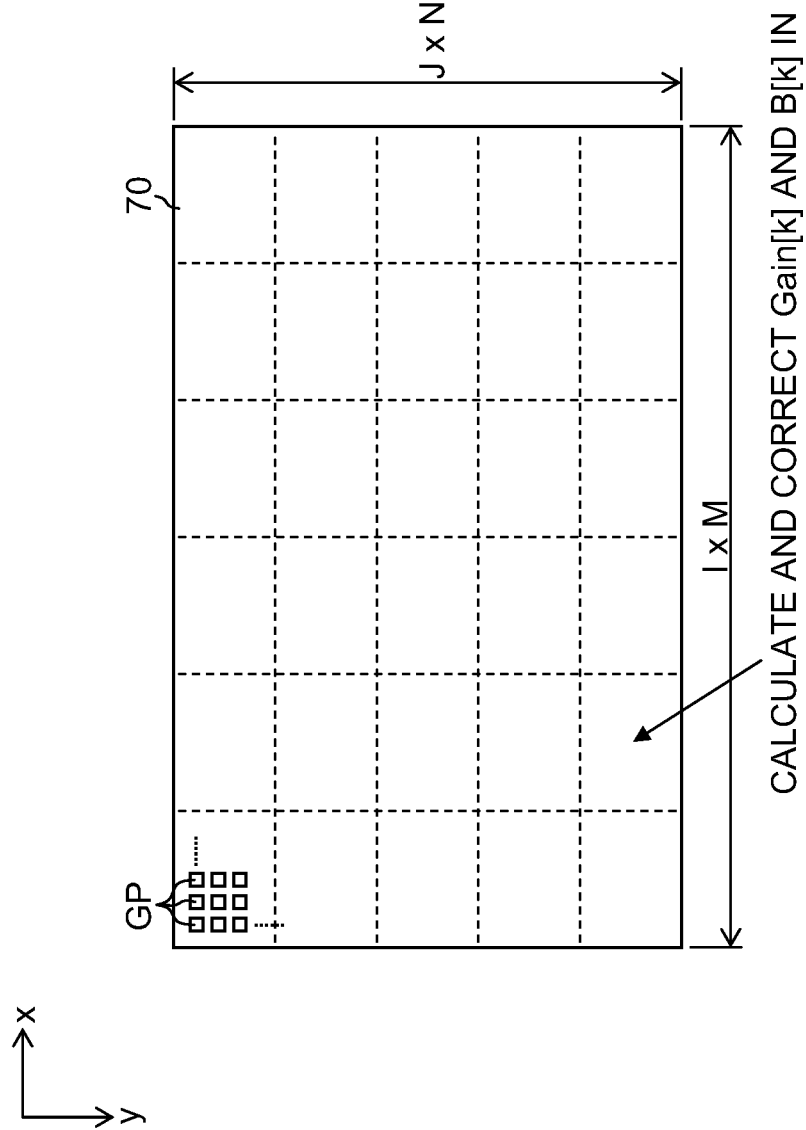
FIG. 12 is an explanatory view to be used for describing a case of calculating a compensation gain with use of an average value of output values in each division area.

When the characteristic information detection unit 42 calculates the compensation gain Gain[k] by averaging output values of respective pixels (k-th pixels) in the 2×2 pixels corresponding to the same-color square array pattern GP in each of a plurality of pixels (each k-th pixel group) which are same in the position with respect to the amplifier 66, the characteristic information detection unit 42 divides the effective pixel region 70 of the image pickup element 12 into a plurality of division areas as illustrated in FIG. 12, and averages the output values of the respective pixels (k-th pixels) in each of these division areas. In short, sensitivity S[k] is calculated by averaging the output values of the k-th pixel in the light irradiation state in each of the division areas, and with use of the sensitivity S[k], the compensation gain Gain[k] (=Smax/S[k]) is calculated.

In this example, since output values of the pixels are averaged in each division area to obtain the compensation gain for sensitivity difference correction, it becomes possible to cope with shading.

[Various Kinds of Examples of Color Filter Array]

Hereinafter, various kinds of examples of the color filter array are described in detail.

(First Example of Color Filter Array)

Figure 13:
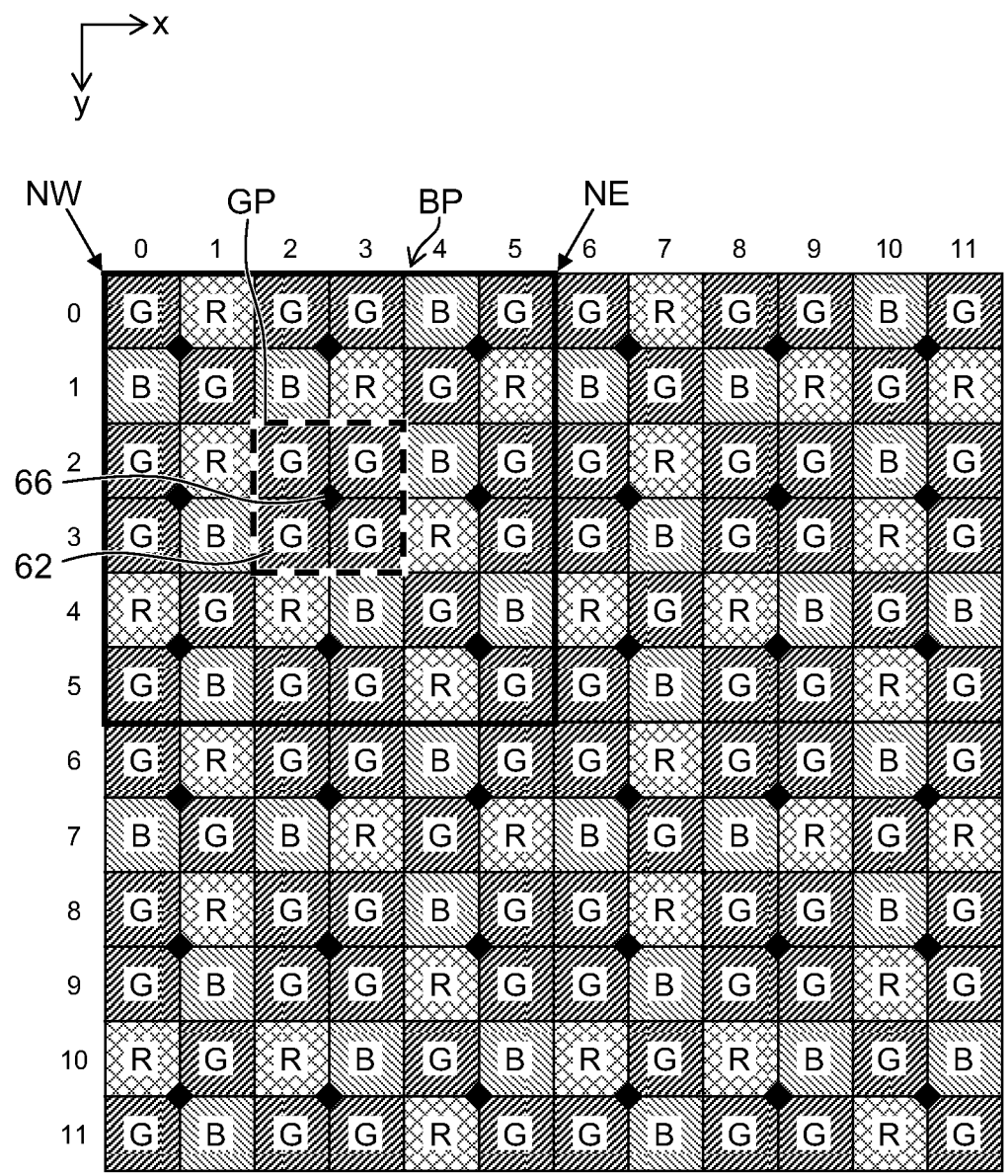
FIG. 13 is a view illustrating a color filter array in the first example.

A color filter array of a first example is illustrated in FIG. 13. This color filter array is the same as the color filter array illustrated in FIG. 3. However, in FIG. 13, numeric values indicating (x, y) coordinates are attached in order to describe characteristics other than the first characteristic (cyclicity of each color in the horizontal direction and the vertical direction) and the second characteristic (existence of one or more same-color square array patterns) which have already described with reference to FIG. 3. Hereinafter, the first to second characteristics are omitted, and third to sixth characteristics are described.

The third characteristic is described. In FIG. 13, when respective colors in a plurality of colors (R, G, B) are observed in the basic array pattern BP, one or more of each color are arranged in each line in the horizontal direction x and the vertical direction y in the basic array pattern BP. For example, in the basic array pattern BP, one or more "G" color filters (hereinafter simply referred to as "G") are arranged in each line of x=0 to 5 in the horizontal direction x, and one or more "G" are arranged in each line of y=0 to 5 in the vertical direction y. Similarly, in the basic array pattern BP, one or more "R" color filters (hereinafter simply referred to as "R") are arranged in each line of x=0 to 5 in the horizontal direction x, and one or more "R" are arranged in each line of y=0 to 5 in the vertical direction y. Similarly, in the basic array pattern BP, one or more "B" color filters (hereinafter simply referred to as "B") are arranged in each line of x=0 to 5 in the horizontal direction x, and one or more "B" are arranged in each line of y=0 to 5 in the vertical direction y. Because of such a characteristic, generation of color moire (false color) can be suppressed.

The fourth characteristic is described. In FIG. 13, when each of a plurality of colors (R, G, B) are observed in each of the horizontal direction x and the vertical direction y, the plurality of color filters form lines where same-color filters are arrayed at two or more kinds of arrangement intervals on the same line. For example, when "G" is observed in the horizontal line y=0 (the uppermost horizontal line in FIG. 13), an interval between "G" at coordinates (0, 0) and "G" at coordinates (2, 0) is two pixels, whereas an interval between "G" at coordinates (2, 0) and "G" at coordinates (3, 0) is one pixel. This also applies to the horizontal lines of y=2, 3 and 5. When "B" is observed in the horizontal line y=1 (the second uppermost horizontal line in FIG. 13), an interval of "B" at coordinates (0, 1) and "B" at coordinates (2, 1) is two pixels, whereas an interval of "B" at coordinates (2, 1) and "B" at coordinates (6, 1) is four pixels. When "R" is observed in the same horizontal line y=1, an interval of "R" at coordinates (3, 1) and "R" at coordinates (5, 1) is two pixels, whereas an interval of "R" at coordinates (5, 1) and "R" at coordinates (9, 1) is four pixels. This also applies to the horizontal line y=4. This also applies to each color viewed in the vertical lines. Such lines are present in each of the horizontal direction x and the vertical direction y at intervals equal to or less than the repeating cycle of the basic array patterns BP (6 in the horizontal direction x and 6 in the vertical direction). Because of such a characteristic, generation of geometric noise with cyclic patterns is suppressed.

The fifth characteristic is described. The G filters corresponding to luminance pixels are arranged so that two or more G filters, which are adjacent to each other in each of a horizontal direction, a vertical direction, and oblique directions (NE, NW), are included in the basic array pattern P.

Since the G filters corresponding to the luminance pixels are arranged in the respective lines in the horizontal, vertical and oblique (NE, NW) directions in the color filter array, a degree of reproducibility in the synchronization processing in a high frequency region can be enhanced regardless of a high frequency direction.

The sixth characteristic is described. In FIG. 13, when each of the color filters 64 that form the same-color square array pattern GP is defined as a k-th same color filter (k represents an integer of 1 to 4 that indicates a position with respect to the amplifier 66), color combination (RGB) and the number of respective colors (two R filters, four G filters and two B filters) are identical among the plurality of color filters (BRGGG-BRG in a clockwise rotation starting from 0 o'clock direction) adjacent to a first same-color filter (an upper left "G" with respect to the amplifier 66), the plurality of color filters (BRGGGBRG in the clockwise rotation starting from 3 o'clock direction) adjacent to a second same-color filter (an upper right "G" with respect to the amplifier 66), the plurality of color filters (BRGGGBRG in the clockwise rotation starting from 6 o'clock direction) adjacent to a third same-color filter (a lower left "G" with respect to the amplifier 66), and the plurality of color filters (BRGGGBRG in the clockwise rotation starting from 9 o'clock direction) adjacent to a fourth same-color filter (a lower right "G" with respect to the amplifier 66). In this example, regardless of which same-color filter is observed in one same-color square array pattern, color filters adjacent to the same-color filter are all arrayed in the order of BRGGGBRG in the clockwise rotation. In short, all the same-color filters are surrounded with the color filters which adjoin in a similar color arrangement.

Figure 14:
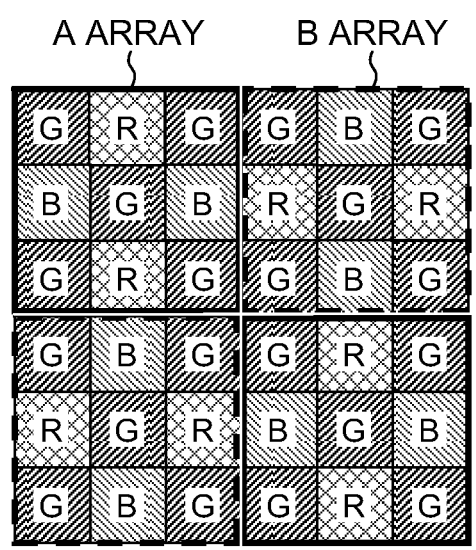
FIG. 14 is an explanatory view to be used for describing a basic array pattern in the color filter array of the first example.

FIG. 14 illustrates the basic array pattern BP illustrated in FIG. 13 being divided into four groups of 3×3 pixels. As illustrated in FIG. 14, the basic array pattern BP may also be construed as an array formed by alternately placing an A array of 3×3 pixels surrounded with a solid frame line and a B array of 3×3 pixels surrounded with a broken frame line in the horizontal direction and the vertical direction. In each of the A array and the B array, G filters which are for luminance pixels are arranged at four corners and at the center, so that they are arranged on both the diagonal lines. Moreover, in the A array, B filters are arrayed in the horizontal direction and R filters are arrayed in the vertical direction across a central G filter. Contrary to this, in the B array, R filters are arrayed in the horizontal direction and B filters are arrayed in the vertical direction across the central G filter. In other words, in the A array and the B array, positional relationship with R filters and B filters are opposite, though other arrangement features are identical.

Moreover, the basic array pattern BP illustrated in FIG. 13 is configured in point symmetry with respect to the center (the center of four G filters) of the basic array pattern. Further, as illustrated in FIG. 14, both the A array and the B array in the basic array pattern are configured in point symmetry with respect to the central G filter, and also the upper and lower sides as well as the right and left sides are both symmetric (line-symmetric) to each other. Furthermore, in the color filter array of the image pickup element 12, the G filters are arranged in each line in the oblique directions (NE, NW) of the color filter array as illustrated in FIG. 13, which provides a characteristic that the degree of reproducibility in the synchronization processing in a high frequency region can be enhanced more.

(Second Example of Color Filter Array)

Figure 15:
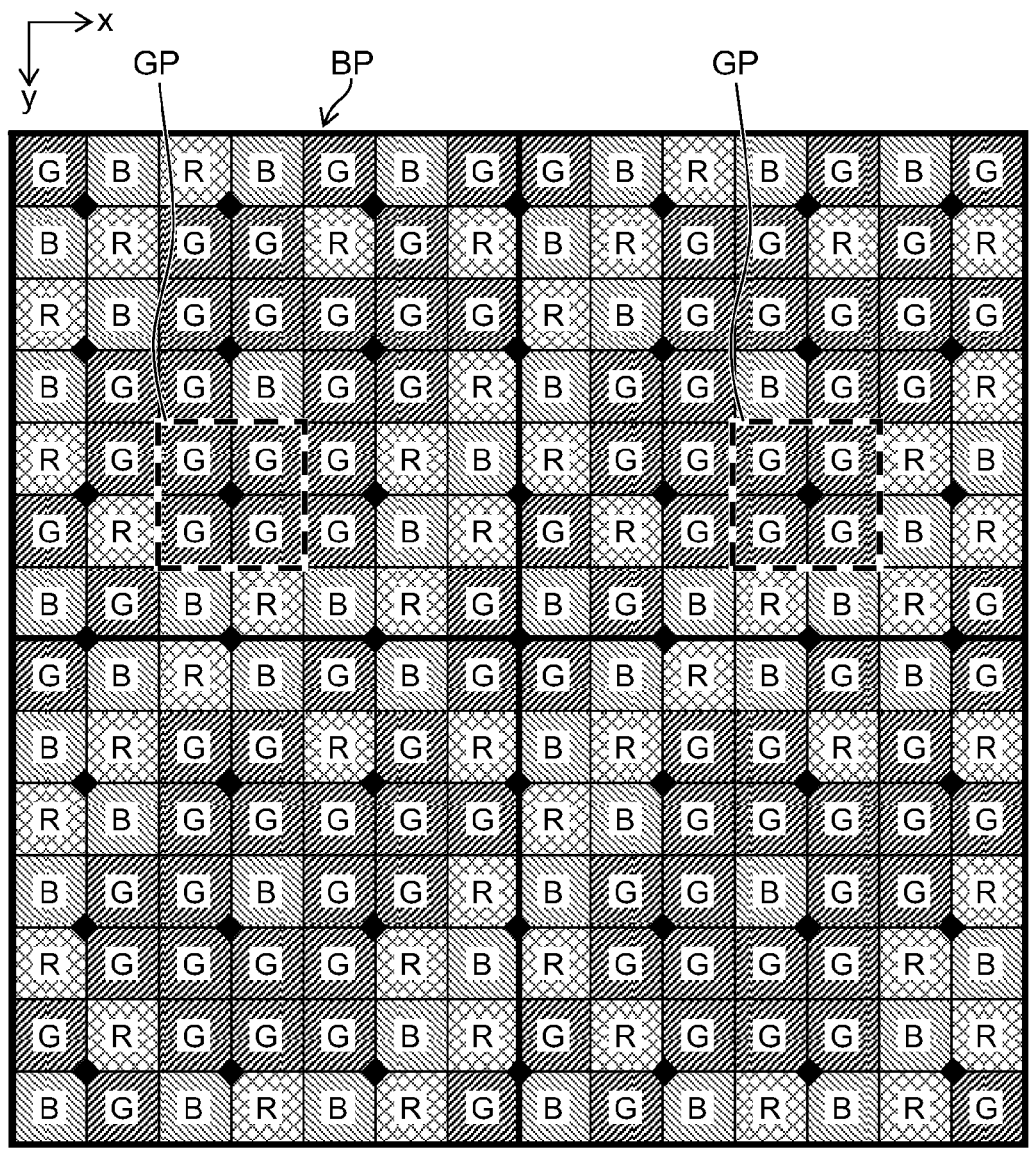
FIG. 15 is a view illustrating a color filter array in the second example.

FIG. 15 illustrates a second example of a color filter array of the image pickup element.

As illustrated in FIG. 15, the color filter array includes a basic array pattern BP (a pattern illustrated with a thick frame) made of a square array pattern corresponding to 7×7 pixels, the basic array pattern BP being repeatedly arranged in the horizontal direction and the vertical direction. That is, the color filter array is formed from filters of respective colors of R, G, and B (R filter, G filter, B filter) which are arrayed with specified cyclicity (first characteristic), as in the color filter array in the first example illustrated in FIG. 13.

Moreover, the basic array pattern BP includes 2×2 color filters (color filters of the same-color square array pattern GP) which are matched in position with the 2×2 pixels of the amplifier-sharing configuration both in the horizontal direction x and the vertical direction y (second characteristic).

Figure 16:
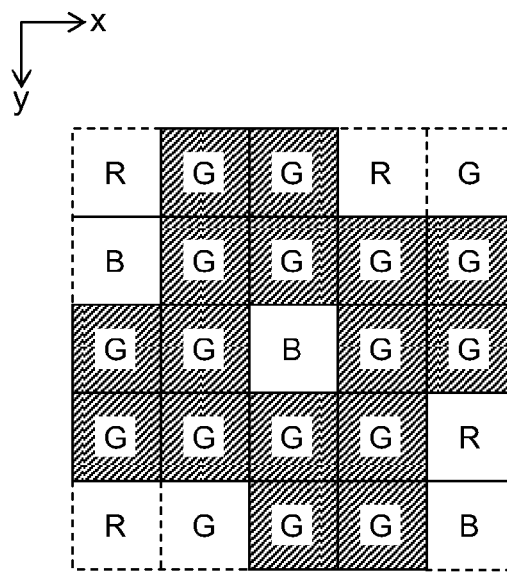
FIG. 16 is an explanatory view to be used for describing a same-color square array pattern in the color filter array of the second example.

However, the basic array pattern BP of this example is formed from an odd number of color filters arranged in each of the horizontal direction x and the vertical direction y. Therefore, as illustrated in FIG. 16, same G color 2×2 patterns are arranged so as to be shifted from each other by an odd number of pixels (1 pixel in this example) in each of the horizontal direction x and the vertical direction y.

Figure 17:
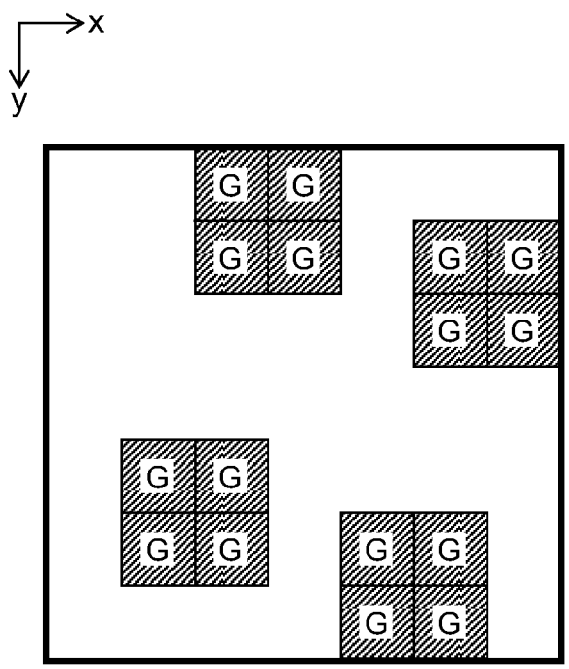
FIG. 17 is an explanatory view to be used for describing a variation of the same-color square array pattern in the color filter array of the second example.
Figure 18:
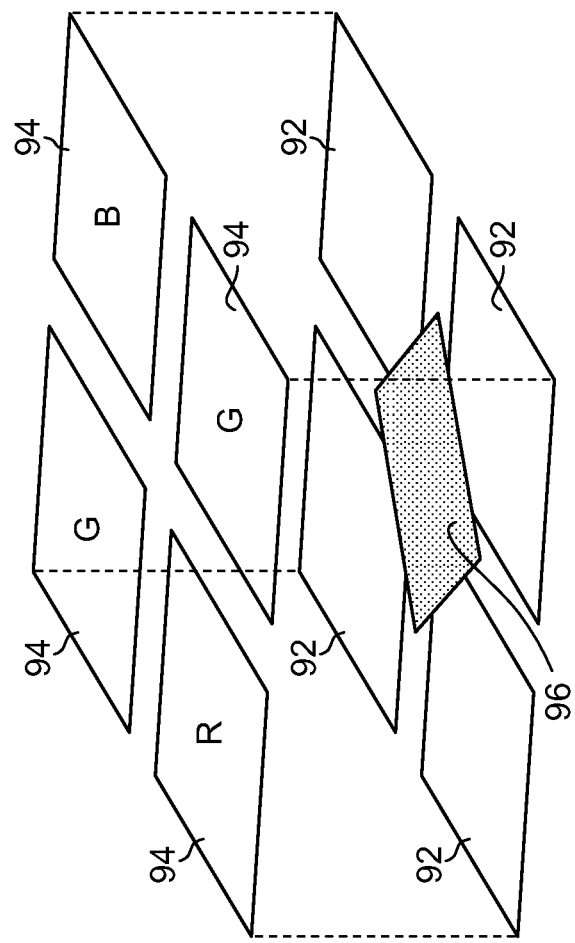
FIG. 18 is an explanatory view to be used for describing an issue attributed to an amplifier-sharing configuration.
Figure 19:
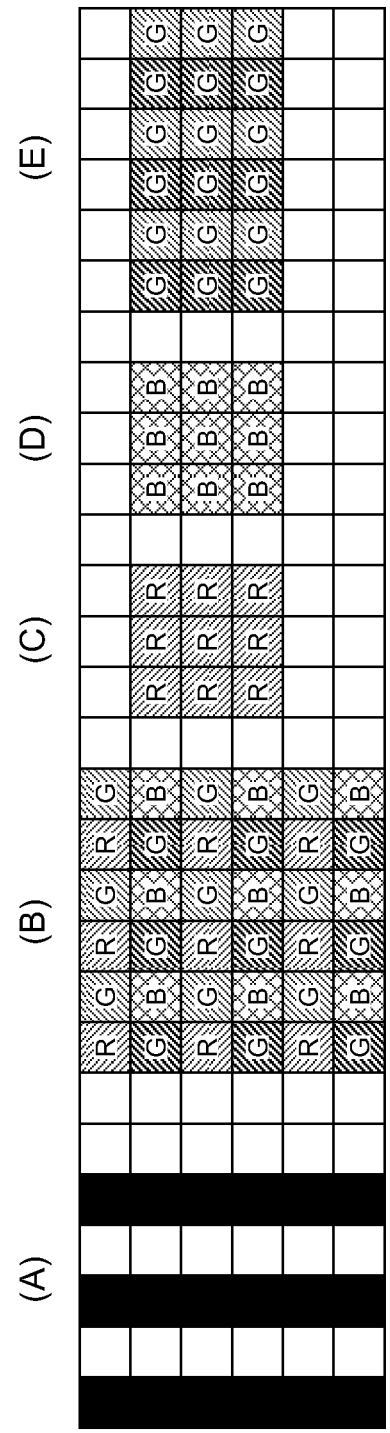
FIG. 19 is a first explanatory view to be used for describing an issue attributed to the Bayer array.
Figure 20:
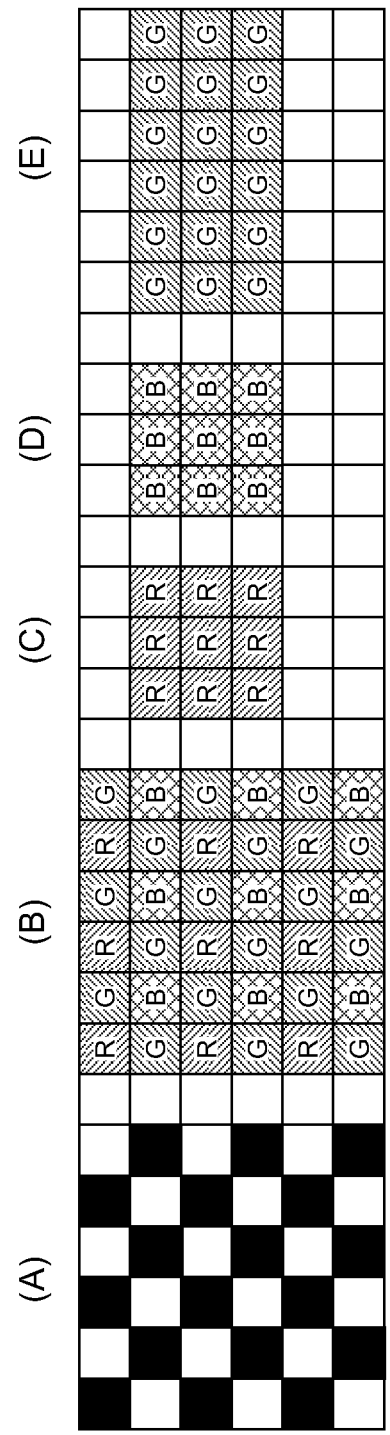
FIG. 20 is a second explanatory view to be used for describing the issue attributed to the Bayer array.

As illustrated in FIG. 17, four pixels in each of the same-color 2×2 patterns may be arranged so as to be shifted both in the horizontal direction x and the vertical direction y. That is, the four pixels in the same-color 2×2 patterns may be arranged so as to be placed at four kinds of positions, (2n, 2m), (2n+1, 2m), (2n, 2m+1), and (2n+1, 2m+1). In other words, four same-color color filters of 2×2 arrangement may be placed at four different positions with respect to the amplifier 66.

Thus, since the plurality of same-color square array patterns GP are arranged so as to be shifted from each other by an odd number of pixels, it is ensured that each of the basic array pattern BP includes one or more same-color square array patterns GP which are matched with the sharing configuration pattern (CP of FIG. 2) that share the amplifier 66. By measuring an output value of each pixel in the same-color square array pattern GP, characteristic variation attributed to the pixel position with respect to the amplifier 66 can appropriately be measured and corrected.

(Others)

Although the image pickup element having trichromatic RGB color filters has been described in the above example, the presently disclosed subject matter is not limited thereto and is also applicable to an image pickup element having four-color filters including illustrated trichromatic RGB colors+another color (such as emerald (E)).

The presently disclosed subject matter is also applicable to an image pickup element having four-color complementary color filters including C (cyan), M (magenta) and Y (yellow), which are the complementary colors of the primary colors RGB, with G color added thereto.

Although the description has been given of the cases where a plurality of pixels share only the amplifier (amplifying element) as an example, it should naturally be understood that the presently disclosed subject matter is also applicable to the cases where other circuit elements are shared as long as the sharing configuration that causes sensitivity differences is employed. Sensitivity correction in such cases is also embraced in the presently disclosed subject matter.

Further, although only the cases where the basic array pattern BP is made of 6×6 filters and 7×7 filters have been illustrated, it should naturally be understood that the basic array pattern BP may be made of filters of other arrangements (8×8, 9×9, . . . ). However, in consideration of facilitating image processing, such as synchronization processing (demosaicing) and thinning-out processing during moving image taking, I and J are preferably 10 or less.

It should naturally be understood that the presently disclosed subject matter is not restricted by examples described in this specification and in the examples illustrated with reference to the drawings, and various modifications and variation in design which come within the meaning of the presently disclosed subject matter are possible.

This specification discloses the following aspects.

Aspect 1: an image pickup apparatus, including: an image pickup element configured such that a plurality of color filters are respectively arranged on a plurality of pixels including photoelectric conversion elements that are two-dimensionally arrayed in a horizontal direction and a vertical direction; storage means configured to store information for correcting a sensitivity difference between the plurality of pixels of the image pickup element; and sensitivity difference correction means configured to correct the sensitivity difference between the plurality of pixels of the image pickup element with use of the information stored in the storage means, wherein the plurality of pixels of the image pickup element share a specific circuit element in units of 2×2 pixels, wherein the plurality of color filters of the image pickup element are configured such that basic array patterns are repeatedly arranged in the horizontal direction and the vertical direction, each of the basic array patterns being made of I×J color filters (I represents a number in the horizontal direction while J represents a number in the vertical direction), the color filters of each of three or more colors being arrayed in a mixed state in each of the basic array patterns, an arrangement cycle (I×J) of a basic array pattern is different from an arrangement cycle (2×2) of a sharing configuration pattern which is made of the specific circuit element and the 2×2 pixels, and the basic array pattern includes at least one same-color square array pattern which is made of 2×2 color filters respectively arranged on the 2×2 pixels of the sharing configuration pattern, the 2×2 color filters having a same color, wherein the storage means stores information on sensitivity of the 2×2 pixels corresponding to the same-color square array pattern, the sensitivity being calculated from output values of the 2×2 pixels corresponding to the same-color square array pattern, and wherein the sensitivity difference correction means corrects sensitivity differences of whole pixels corresponding to a picked-up image of the image pickup element with use of the information on the sensitivity of the 2×2 pixels corresponding to the same-color square array pattern stored in the storage means.

Aspect 2: the image pickup apparatus according to the aspect 1, including detection means configured to detect the information on the sensitivity from the output values of the 2×2 pixels corresponding to the same-color square array pattern, wherein the storage means stores the information on the sensitivity detected by the detection means.

Aspect 3: the image pickup apparatus according to the aspect 2, wherein when a coordinate position of a k-th pixel (k represents an integer from 1 to 4 that indicates a position with respect to the specific circuit element) in the 2×2 pixels corresponding to the same-color square array pattern in the image pickup element is defined as C[k], in a light irradiation state where the plurality of pixels of the image pickup element are irradiated with light, the detection means acquires an output value Data (C[1]) of a first pixel, an output value Data (C[2]) of a second pixel, an output value Data (C[3]) of a third pixel, and an output value Data (C[4]) of a fourth pixel for each of two or more basic array patterns, calculates an average S[k] of output values Data (C[k]) of each k-th pixel group across the two or more basic array patterns as sensitivity, and the detection means further calculates information indicating a ratio between an average S[1] of output values of a first pixel group, an average S[2] of output values of a second pixel group, an average S[3] of output values of a third pixel group, and an average S[4] of output values of a fourth pixel group, as the information on the sensitivity.

Aspect 4: the image pickup apparatus according to the aspect 3, wherein the detection means extracts a maximum Smax from among averages S[k] (k represents an integer from 1 to 4) of the output values, and calculates a compensation gain Gain[k]=Smax/S[k] as the information on the sensitivity.

Aspect 5: the image pickup apparatus according to the aspect 2, wherein when a coordinate position of a k-th pixel (k represents an integer from 1 to 4 that indicates a position with respect to the specific circuit element) in the 2×2 pixels of the sharing configuration pattern in the image pickup element is defined as CC[k], in a light shielding state where the plurality of pixels of the image pickup element are shielded from light, the detection means acquires an output value BData (CC[1]) of a first pixel, an output value BData (CC[2]) of a second pixel, an output value BData (CC[3]) of a third pixel, and an output value BData (CC[4]) of a fourth pixel for each of two or more sharing configuration patterns, and calculates an average B[k] of output values BData[k] of each k-th pixel group across the two or more sharing configuration patterns, and the storage means stores the average B[k] acquired by the detection means as a black level.

Aspect 6: the image pickup apparatus according to the aspect 5, wherein when corrected output values of the 2×2 pixels in each of the sharing configuration patterns are defined as Data' (CC[k]) (k represents an integer from 1 to 4 that indicates the position with respect to the specific circuit element), the sensitivity difference correction means calculates Data' (CC[k])=Data (CC[k])−B[k]×Gain[k].

Aspect 7: the image pickup apparatus according to the aspect 5 or 6, including: a photographic lens configured to form an image of incident object light as an object image; opening/closing means configured to open and close an optical path of the object light extending from the photographic lens to the image pickup element so as to switch the light shielding state and a light irradiation state of the image pickup element; and control means configured to put the image pickup element in the light shielding state with the opening/closing means and to make the detection means detect the black level B[k] of the image pickup element, the control means configured to put the image pickup element in the light irradiation state with the opening/closing means and to make the detection means detect the sensitivity S[k] of the image pickup element.

Aspect 8: the image pickup apparatus according to the aspect 7, wherein when a power supply of the image pickup apparatus is turned on, the control means makes the detection means detect the black level B[k] in the light shielding state where the opening/closing means is closed, and the control means makes the opening/closing means open to switch a state of the image pickup element to the light irradiation state, sets the photographic lens in a defocus state, and makes the detection means detect the sensitivity S[k].

Aspect 9: the image pickup apparatus according to the aspect 7, wherein when a power supply of the image pickup apparatus is turned off, the control means sets the photographic lens in a defocus state in the light irradiation state where the opening/closing means is opened and makes the detection means detect the sensitivity S[k], and the control means also puts the image pickup element in the light shielding state and makes the detection means detect the black level B[k].

Aspect 10: the image pickup apparatus according to any one of the aspects 2 to 9, including instruction input means configured to receive an input of an imaging instruction, wherein the detection means detects the sensitivity S[k] based on the picked-up image picked up by the image pickup element in accordance with the imaging instruction.

Aspect 11: the image pickup apparatus according to any one of the aspects 2 to 10, wherein the detection means calculates the information on the sensitivity by averaging output values of respective pixels (k-th pixels) in the 2×2 pixels corresponding to the same-color square array pattern in a plurality of pixels (k-th pixel group) which are in a same position with respect to the specific circuit element, the detection means averaging the output values of the pixels across a whole region corresponding to the picked-up image of the image pickup element.

Aspect 12: the image pickup apparatus according to any one of the aspects 2 to 11, wherein the detection means calculates the information on the sensitivity by averaging output values of respective pixels (k-th pixels) in the 2×2 pixels corresponding to the same-color square array pattern in a plurality of pixels (k-th pixel group) which are in a same position with respect to the specific circuit element, the detection means dividing a whole region corresponding to the picked-up image of the image pickup element and averaging the output values of the pixels in each of division areas.

Aspect 13: an image pickup element configured such that a plurality of color filters are respectively arranged on a plurality of pixels including photoelectric conversion elements that are two-dimensionally arrayed in a horizontal direction and a vertical direction, wherein the plurality of pixels share a specific circuit element in units of 2×2 pixels, wherein the plurality of color filters are configured such that basic array patterns are repeatedly arranged in the horizontal direction and the vertical direction, each of the basic array patterns being made of I×J color filters (I represents a number in the horizontal direction while J represents a number in the vertical direction), the color filters of each of three or more colors being arrayed in a mixed state in each of the basic array patterns, an arrangement cycle (I×J) of a basic array pattern is different from an arrangement cycle (2×2) of a sharing configuration pattern which is made of the specific circuit element and the 2×2 pixels, and the basic array pattern includes at least one same-color square array pattern which is made of 2×2 color filters respectively arranged on the 2×2 pixels of the sharing configuration pattern, the 2×2 color filters having a same color.

Aspect 14: the image pickup element according to the aspect 13, wherein when each of the color filters that form the same-color square array pattern is defined as a k-th same color filter (k represents an integer of 1 to 4), color combination and a number of respective colors are identical among a plurality of color filters adjacent to a first same-color filter, a plurality of color filters adjacent to a second same-color filter, a plurality of color filters adjacent to a third same-color filter, and a plurality of color filters adjacent to a fourth same-color filter.

Aspect 15: the image pickup element according to the aspect 13 or 14, wherein regarding each of a plurality of colors, one or more color filters of the plurality of color filters are arranged in each line in the horizontal direction and the vertical direction in the basic array pattern.

Aspect 16: the image pickup element according to any one of the aspects 13 to 15, wherein in the plurality of color filters, regarding each of a plurality of colors, there is a line where color filters of a same color are arrayed at two or more kinds of arrangement intervals, in each of the horizontal and vertical directions.

Aspect 17: the image pickup element according to any one of the aspects 13 to 15, wherein among the plurality of color filters, color filters of a specific color that contributes to acquisition of a luminance signal are arranged so that the basic array pattern includes a portion in which two or more of the color filters of the specific color are adjacent in each of the horizontal direction, the vertical direction, and oblique directions.

Aspect 18: the image pickup element according to any one of the aspects 13 to 17, wherein in the basic array pattern, a number of the color filters in the horizontal direction is equal to a number of the color filters in the vertical direction.

Aspect 19: the image pickup element according to any one of the aspects 13 to 18, wherein colors in a color filter array in the basic array pattern are arrayed in point symmetry with respect to a center of the basic array pattern.

Aspect 20: the image pickup element according to any one of the aspects 13 to 19, wherein a first 3×3 array and a second 3×3 array are configured to be arrayed alternately in the horizontal direction and the vertical direction, the first 3×3 array corresponding to 3×3 pixels and having G filters arranged at a center and four corners, R filters arranged on upper and lower sides across a G filter at the center, and B filters arranged on left and right sides across the G filter at the center, the second 3×3 array corresponding to 3×3 pixels and having G filters arranged at a center and four corners, B filters arranged on upper and lower sides across a G filter at the center, and R filters arranged on left and right sides across the G filter at the center, where G represents a green color, R represents a red color, and B represents a blue color.

Aspect 21: the image pickup element according to any one of the aspects 13 to 19, wherein the basic array pattern has an odd number of color filters in the horizontal direction and in the vertical direction, and includes a plurality of 2×2 array patterns each made of 2×2 color filters of a same color, and the 2×2 array patterns are arranged so as to be shifted from each other by an odd number of pixels in each of the horizontal direction and the vertical direction.

Aspect 22: a method for correcting a sensitivity difference for an image pickup element configured such that a plurality of color filters are respectively arranged on a plurality of pixels including photoelectric conversion elements that are two-dimensionally arrayed in a horizontal direction and a vertical direction, wherein the plurality of pixels of the image pickup element share a specific circuit element in units of 2×2 pixels, wherein the plurality of color filters of the image pickup element are formed from basic array patterns repeatedly arranged in the horizontal direction and the vertical direction, each of the basic array patterns being made of I×J color filters (I represents a number in the horizontal direction while J represents a number of in the vertical direction), the color filters of each of three or more colors being arrayed in a mixed state in each of the basic array patterns, an arrangement cycle (I×J) of a basic array pattern is different from an arrangement cycle (2×2) of a sharing configuration pattern which is made of the specific circuit element and the 2×2 pixels, and the basic array pattern includes at least one same-color square array pattern which is made of 2×2 color filters respectively arranged on the 2×2 pixels of the sharing configuration pattern, the 2×2 color filters having a same color, the method including: prestoring information on sensitivity of the 2×2 pixels corresponding to the same-color square array pattern, the information on the sensitivity being calculated from output values of the 2×2 pixels corresponding to the same-color square array pattern; and correcting a sensitivity difference between pixels in the I×J pixels corresponding to the basic array pattern in all the pixels of the image pickup element with use of the information on the sensitivity of the 2×2 pixels corresponding to the same-color square array pattern stored in the storage device.

Aspect 23: a method for correcting a sensitivity difference for an image pickup element in an image pickup apparatus, including: the image pickup element configured such that a plurality of color filters are respectively arranged on a plurality of pixels including photoelectric conversion elements that are two-dimensionally arrayed in a horizontal direction and a vertical direction, a photographic lens configured to form an image of incident object light as an object image, opening/closing means configured to open and close an optical path of the object light extending from the photographic lens to the image pickup element so as to switch a light shielding state and a light irradiation state of the image pickup element, instruction input means configured to receive an input of an imaging instruction, and a storage device configured to store information, wherein the plurality of pixels of the image pickup element share a specific circuit element in units of 2×2 pixels, wherein the plurality of color filters of the image pickup element are formed from basic array patterns repeatedly arranged in the horizontal direction and the vertical direction, each of the basic array patterns being made of I×J color filters (I represents a number in the horizontal direction while J represents a number in the vertical direction), the plurality of color filters of each of three or more colors being arrayed in a mixed state in each of the basic array patterns, an arrangement cycle (I×J) of a basic array pattern is different from an arrangement cycle (2×2) of a sharing configuration pattern which is made of the specific circuit element and the 2×2 pixels, and the basic array pattern includes at least one same-color square array pattern which is made of 2×2 color filters respectively arranged on the 2×2 pixels of the sharing configuration pattern, the 2×2 color filters having a same color, the method including: when a power supply of the image pickup apparatus is turned on, detecting as a black level an output value of each pixel in the 2×2 pixels corresponding to the same-color square array pattern among the I×J pixels corresponding to the basic array pattern in the light shielding state where the opening/closing means is closed, putting the image pickup element in the light irradiation state with the opening/closing means and putting the photographic lens in a defocus state so as to detect as sensitivity an output value of each pixel in the 2×2 pixels corresponding to the same-color square array pattern among the I×J pixels corresponding to the basic array pattern; storing information on the sensitivity and the black level of the 2×2 pixels corresponding to the same-color square array pattern in the storage device; and when the imaging instruction is inputted into the instruction input means, using the information stored in the storage device to correct a sensitivity difference between pixels in the I×J pixels corresponding to the basic array pattern.

Aspect 24: a method for correcting a sensitivity difference for an image pickup element in an image pickup apparatus, including: the image pickup element configured such that a plurality of color filters are respectively arranged on a plurality of pixels including photoelectric conversion elements that are two-dimensionally arrayed in a horizontal direction and a vertical direction, a photographic lens configured to form an image of incident object light as an object image, opening/closing means configured to open and close an optical path of the object light extending from the photographic lens to the image pickup element so as to switch a light shielding state and a light irradiation state of the image pickup element, instruction input means configured to receive an input of an imaging instruction, and a storage device configured to store information, wherein the plurality of pixels of the image pickup element share a specific circuit element in units of 2×2 pixels, wherein the plurality of color filters of the image pickup element are configured such that basic array patterns repeatedly arranged in the horizontal direction and the vertical direction, each of the basic array patterns being made of I×J color filters (I represents a number in the horizontal direction while J represents a number in the vertical direction), the color filters of each of three or more colors being arrayed in a mixed state in each of the basic array patterns, an arrangement cycle (I×J) of a basic array pattern is different from an arrangement cycle (2×2) of a sharing configuration pattern which is made of the specific circuit element and the 2×2 pixels, and the basic array pattern includes at least one same-color square array pattern which is made of 2×2 color filters respectively arranged on the 2×2 pixels of the sharing configuration pattern, the 2×2 color filters having a same color, the method including: when a power supply of the image pickup apparatus is turned off, setting the photographic lens in a defocus state in the light irradiation state where the opening/closing means is opened, and detecting as sensitivity an output value of each pixel in the 2×2 pixels corresponding to the same-color square array pattern among the I×J pixels corresponding to the basic array pattern, putting the image pickup element in the light shielding state with the opening/closing means and detecting as a black level an output value of each pixel in the 2×2 pixels corresponding to the same-color square array pattern among the I×J pixels corresponding to the basic array pattern; storing information on the sensitivity of the 2×2 pixels corresponding to the same-color square array pattern and the black level in the storage device; and when the imaging instruction is inputted into the instruction input means, using the information stored in the storage device to correct a sensitivity difference between pixels in the I×J pixels corresponding to the basic array pattern.

Aspect 25: a method for correcting a sensitivity difference for an image pickup element in an image pickup apparatus, including: the image pickup element configured such that a plurality of color filters are respectively arranged on a plurality of pixels including photoelectric conversion elements that are two-dimensionally arrayed in a horizontal direction and a vertical direction, a photographic lens configured to form incident object light as an object image, instruction input means configured to receive an input of an imaging instruction, and a storage device configured to store information, wherein the plurality of pixels of the image pickup element share a specific circuit element in units of 2×2 pixels, wherein the plurality of color filters of the image pickup element are configured such that basic array patterns are repeatedly arranged in the horizontal direction and the vertical direction, each of the basic array patterns being made of I×J color filters (I represents a number in the horizontal direction while J represents a number in the vertical direction), the color filters of each of three or more colors being arrayed in a mixed state in each of the basic array patterns, wherein an arrangement cycle (I×J) of the basic array pattern is different from an arrangement cycle (2×2) of a sharing configuration pattern which is made of the specific circuit element and the 2×2 pixels, and the basic array pattern includes at least one same-color square array pattern which is made of 2×2 color filters respectively arranged on the 2×2 pixels of the sharing configuration pattern, the 2×2 color filters having a same color, the method including: when an object is imaged with the image pickup element upon input of the imaging instruction, detecting as sensitivity at least an output value of each pixel in the 2×2 pixels corresponding to the same-color square array pattern among the I×J pixels corresponding to the basic array pattern, based on a picked-up image acquired by the image pickup element; storing characteristic information on the sensitivity of the 2×2 pixels corresponding to the same-color square array pattern in the storage device; and at a time of next imaging, correcting a sensitivity difference between the pixels in the I×J pixels corresponding to the basic array pattern with use of the characteristic information on the 2×2 pixels corresponding to the same-color square array pattern stored in the storage device.

What is claimed is:
1. An image pickup apparatus, comprising:
an image pickup element configured such that a plurality of color filters are respectively arranged on a plurality of pixels including photoelectric conversion elements that are two-dimensionally arrayed in a horizontal direction and a vertical direction;
a storage device configured to store information for correcting a sensitivity difference between the plurality of pixels of the image pickup element; and
a sensitivity difference correction device configured to correct the sensitivity difference between the plurality of pixels of the image pickup element with use of the information stored in the storage device,
wherein the plurality of pixels of the image pickup element share a specific circuit element in units of 2×2 pixels,
wherein the plurality of color filters of the image pickup element are configured such that basic array patterns are repeatedly arranged in the horizontal direction and the vertical direction, each of the basic array patterns being made of I×J color filters (I represents a number in the horizontal direction while J represents a number in the vertical direction), the color filters of each of three or more colors being arrayed in a mixed state in each of the basic array patterns,
an arrangement cycle (I×J) of a basic array pattern is different from an arrangement cycle (2×2) of a sharing configuration pattern which is made of the specific circuit element and the 2×2 pixels, and
the basic array pattern includes at least one same-color square array pattern which is made of 2×2 color filters respectively arranged on the 2×2 pixels of the sharing configuration pattern, the 2×2 color filters having a same color, wherein the storage device stores information on sensitivity of the 2×2 pixels corresponding to the same-color square array pattern, the sensitivity being calculated from output values of the 2×2 pixels corresponding to the same-color square array pattern, and wherein the sensitivity difference correction device corrects sensitivity differences of whole pixels corresponding to a picked-up image of the image pickup element with use of the information on the sensitivity of the 2×2 pixels corresponding to the same-color square array pattern stored in the storage device.

2. The image pickup apparatus according to claim 1, further comprising a detection device configured to detect the information on the sensitivity from the output values of the 2×2 pixels corresponding to the same-color square array pattern, wherein the storage device stores the information on the sensitivity detected by the detection device.

3. The image pickup apparatus according to claim 2, wherein when a coordinate position of a k-th pixel (k represents an integer from 1 to 4 that indicates a position with respect to the specific circuit element) in the 2×2 pixels corresponding to the same-color square array pattern in the image pickup element is defined as C[k], in a light irradiation state where the plurality of pixels of the image pickup element are irradiated with light, the detection device acquires an output value Data (C[1]) of a first pixel, an output value Data (C[2]) of a second pixel, an output value Data (C[3]) of a third pixel, and an output value Data (C[4]) of a fourth pixel for each of two or more basic array patterns, calculates an average S[k] of output values Data (C[k]) of each k-th pixel group across the two or more basic array patterns as sensitivity, and the detection device further calculates information indicating a ratio between an average S[1] of output values of a first pixel group, an average S[2] of output values of a second pixel group, an average S[3] of output values of a third pixel group, and an average S[4] of output values of a fourth pixel group, as the information on the sensitivity.

4. The image pickup apparatus according to claim 3, wherein the detection device extracts a maximum Smax from among averages S[k] (k represents an integer from 1 to 4) of the output values, and calculates a compensation gain Gain[k]=Smax/S[k] as the information on the sensitivity.

5. The image pickup apparatus according to claim 2, wherein when a coordinate position of a k-th pixel (k represents an integer from 1 to 4 that indicates a position with respect to the specific circuit element) in the 2×2 pixels of the sharing configuration pattern in the image pickup element is defined as CC[k], in a light shielding state where the plurality of pixels of the image pickup element are shielded from light, the detection device acquires an output value BData (CC[1]) of a first pixel, an output value BData (CC[2]) of a second pixel, an output value BData (CC[3]) of a third pixel, and an output value BData (CC[4]) of a fourth pixel for each of two or more sharing configuration patterns, and calculates an average B[k] of output values BData[k] of each k-th pixel group across the two or more sharing configuration patterns, and the storage device stores the average B[k] acquired by the detection device as a black level.

6. The image pickup apparatus according to claim 5, wherein when corrected output values of the 2×2 pixels in each of the sharing configuration patterns are defined as Data' (CC[k]) (k represents an integer from 1 to 4 that indicates the position with respect to the specific circuit element), the sensitivity difference correction device calculates Data' (CC[k])=Data (CC[k])−B [k]×Gain[k].

7. The image pickup apparatus according to claim 5, further comprising:

a photographic lens configured to form an image of incident object light as an object image;

an opening/closing device configured to open and close an optical path of the object light extending from the photographic lens to the image pickup element so as to switch the light shielding state and a light irradiation state of the image pickup element; and a control device configured to put the image pickup element in the light shielding state with the opening/closing device and to make the detection device detect the black level B[k] of the image pickup element, the control device configured to put the image pickup element in the light irradiation state with the opening/closing device and to make the detection device detect the sensitivity S[k] of the image pickup element.

8. The image pickup apparatus according to claim 7, wherein when a power supply of the image pickup apparatus is turned on, the control device makes the detection device detect the black level B[k] in the light shielding state where the opening/closing device is closed, and the control device makes the opening/closing device open to switch a state of the image pickup element to the light irradiation state, sets the photographic lens in a defocus state, and makes the detection device detect the sensitivity S[k].

9. The image pickup apparatus according to claim 7, wherein when a power supply of the image pickup apparatus is turned off, the control device sets the photographic lens in a defocus state in the light irradiation state where the opening/closing device is opened and makes the detection device detect the sensitivity S[k], and the control device also puts the image pickup element in the light shielding state and makes the detection device detect the black level B[k].

10. The image pickup apparatus according to claim 2, further comprising an instruction input device configured to receive an input of an imaging instruction, wherein the detection device detects the sensitivity S[k] based on the picked-up image picked up by the image pickup element in accordance with the imaging instruction.

11. The image pickup apparatus according to claim 2, wherein the detection device calculates the information on the sensitivity by averaging output values of respective pixels (k-th pixels) in the 2×2 pixels corresponding to the same-color square array pattern in a plurality of pixels (k-th pixel group) which are in a same position with respect to the specific circuit element, the detection device averaging the output values of the pixels across a whole region corresponding to the picked-up image of the image pickup element.

12. The image pickup apparatus according to claim 2, wherein the detection device calculates the information on the sensitivity by averaging output values of respective pixels (k-th pixels) in the 2×2 pixels corresponding to the same-color square array pattern in a plurality of pixels (k-th pixel group) which are in a same position with respect to the specific circuit element, the detection device dividing a whole region corresponding to the picked-up image of the image pickup element and averaging the output values of the pixels in each of division areas.

13. An image pickup element configured such that a plurality of color filters are respectively arranged on a plurality of pixels including photoelectric conversion elements that are two-dimensionally arrayed in a horizontal direction and a vertical direction,
wherein the plurality of pixels share a specific circuit element in units of 2×2 pixels,
wherein the plurality of color filters are configured such that basic array patterns are repeatedly arranged in the horizontal direction and the vertical direction, each of the basic array patterns being made of I×J color filters (I represents a number in the horizontal direction while J represents a number in the vertical direction), the color filters of each of three or more colors being arrayed in a mixed state in each of the basic array patterns,
an arrangement cycle (I×J) of a basic array pattern is different from an arrangement cycle (2×2) of a sharing configuration pattern which is made of the specific circuit element and the 2×2 pixels, and
the basic array pattern includes at least one same-color square array pattern which is made of 2×2 color filters respectively arranged on the 2×2 pixels of the sharing configuration pattern, the 2×2 color filters having a same color.

14. The image pickup element according to claim 13,
wherein when each of the color filters that form the same-color square array pattern is defined as a k-th same color filter (k represents an integer of 1 to 4), color combination and a number of respective colors are identical among a plurality of color filters adjacent to a first same-color filter, a plurality of color filters adjacent to a second same-color filter, a plurality of color filters adjacent to a third same-color filter, and a plurality of color filters adjacent to a fourth same-color filter.

15. The image pickup element according to claim 13,
wherein regarding each of a plurality of colors, one or more color filters of the plurality of color filters are arranged in each line in the horizontal direction and the vertical direction in the basic array pattern.

16. The image pickup element according to claim 13,
wherein in the plurality of color filters, regarding each of a plurality of colors, there is a line where color filters of a same color are arrayed at two or more kinds of arrangement intervals, in each of the horizontal and vertical directions.

17. The image pickup element according to claim 13,
wherein among the plurality of color filters, color filters of a specific color that contributes to acquisition of a luminance signal are arranged so that the basic array pattern includes a portion in which two or more of the color filters of the specific color are adjacent in each of the horizontal direction, the vertical direction, and oblique directions.

18. The image pickup element according to claim 13,
wherein in the basic array pattern, a number of the color filters in the horizontal direction is equal to a number of the color filters in the vertical direction.

19. The image pickup element according to claim 13,
wherein colors in a color filter array in the basic array pattern are arrayed in point symmetry with respect to a center of the basic array pattern.

20. The image pickup element according to claim 13,
wherein a first 3×3 array and a second 3×3 array are configured to be arrayed alternately in the horizontal direction and the vertical direction,
the first 3×3 array corresponding to 3×3 pixels and having G filters arranged at a center and four corners, R filters arranged on upper and lower sides across a G filter at the center, and B filters arranged on left and right sides across the G filter at the center,
the second 3×3 array corresponding to 3×3 pixels and having G filters arranged at a center and four corners, B filters arranged on upper and lower sides across a G filter at the center, and R filters arranged on left and right sides across the G filter at the center,
where G represents a green color, R represents a red color, and B represents a blue color.

21. The image pickup element according to claim 13,
wherein the basic array pattern has an odd number of color filters in the horizontal direction and in the vertical direction, and includes a plurality of 2×2 array patterns each made of 2×2 color filters of a same color, and
the 2×2 array patterns are arranged so as to be shifted from each other by an odd number of pixels in each of the horizontal direction and the vertical direction.

22. A method for correcting a sensitivity difference for an image pickup element configured such that a plurality of color filters are respectively arranged on a plurality of pixels including photoelectric conversion elements that are two-dimensionally arrayed in a horizontal direction and a vertical direction,
wherein the plurality of pixels of the image pickup element share a specific circuit element in units of 2×2 pixels,
wherein the plurality of color filters of the image pickup element are formed from basic array patterns repeatedly arranged in the horizontal direction and the vertical direction, each of the basic array patterns being made of I×J color filters (I represents a number in the horizontal direction while J represents a number of in the vertical direction), the color filters of each of three or more colors being arrayed in a mixed state in each of the basic array patterns,
an arrangement cycle (I×J) of a basic array pattern is different from an arrangement cycle (2×2) of a sharing configuration pattern which is made of the specific circuit element and the 2×2 pixels, and
the basic array pattern includes at least one same-color square array pattern which is made of 2×2 color filters respectively arranged on the 2×2 pixels of the sharing configuration pattern, the 2×2 color filters having a same color,
the method comprising:
prestoring information on sensitivity of the 2×2 pixels corresponding to the same-color square array pattern, the information on the sensitivity being calculated from output values of the 2×2 pixels corresponding to the same-color square array pattern; and
correcting a sensitivity difference between pixels in the I×J pixels corresponding to the basic array pattern in all the pixels of the image pickup element with use of the information on the sensitivity of the 2×2 pixels corresponding to the same-color square array pattern stored in the storage device.

23. A method for correcting a sensitivity difference for an image pickup element in an image pickup apparatus, including:
- the image pickup element configured such that a plurality of color filters are respectively arranged on a plurality of pixels including photoelectric conversion elements that are two-dimensionally arrayed in a horizontal direction and a vertical direction,
- a photographic lens configured to form an image of incident object light as an object image,
- an opening/closing device configured to open and close an optical path of the object light extending from the photographic lens to the image pickup element so as to switch a light shielding state and a light irradiation state of the image pickup element,
- an instruction input device configured to receive an input of an imaging instruction, and
- a storage device configured to store information,
- wherein the plurality of pixels of the image pickup element share a specific circuit element in units of 2×2 pixels,
- wherein the plurality of color filters of the image pickup element are formed from basic array patterns repeatedly arranged in the horizontal direction and the vertical direction, each of the basic array patterns being made of I×J color filters (I represents a number in the horizontal direction while J represents a number in the vertical direction), the plurality of color filters of each of three or more colors being arrayed in a mixed state in each of the basic array patterns,
- an arrangement cycle (I×J) of a basic array pattern is different from an arrangement cycle (2×2) of a sharing configuration pattern which is made of the specific circuit element and the 2×2 pixels, and
- the basic array pattern includes at least one same-color square array pattern which is made of 2×2 color filters respectively arranged on the 2×2 pixels of the sharing configuration pattern, the 2×2 color filters having a same color, the method comprising:
- when a power supply of the image pickup apparatus is turned on, detecting as a black level an output value of each pixel in the 2×2 pixels corresponding to the same-color square array pattern among the I×J pixels corresponding to the basic array pattern in the light shielding state where the opening/closing device is closed, putting the image pickup element in the light irradiation state with the opening/closing device and putting the photographic lens in a defocus state so as to detect as sensitivity an output value of each pixel in the 2×2 pixels corresponding to the same-color square array pattern among the I×J pixels corresponding to the basic array pattern;
- storing information on the sensitivity and the black level of the 2×2 pixels corresponding to the same-color square array pattern in the storage device; and
- when the imaging instruction is inputted into the instruction input device, using the information stored in the storage device to correct a sensitivity difference between pixels in the I×J pixels corresponding to the basic array pattern.

24. A method for correcting a sensitivity difference for an image pickup element in an image pickup apparatus, including:
- the image pickup element configured such that a plurality of color filters are respectively arranged on a plurality of pixels including photoelectric conversion elements that are two-dimensionally arrayed in a horizontal direction and a vertical direction,
- a photographic lens configured to form an image of incident object light as an object image,
- an opening/closing device configured to open and close an optical path of the object light extending from the photographic lens to the image pickup element so as to switch a light shielding state and a light irradiation state of the image pickup element,
- an instruction input device configured to receive an input of an imaging instruction, and
- a storage device configured to store information,
- wherein the plurality of pixels of the image pickup element share a specific circuit element in units of 2×2 pixels,
- wherein the plurality of color filters of the image pickup element are configured such that basic array patterns repeatedly arranged in the horizontal direction and the vertical direction, each of the basic array patterns being made of I×J color filters (I represents a number in the horizontal direction while J represents a number in the vertical direction), the color filters of each of three or more colors being arrayed in a mixed state in each of the basic array patterns,
- an arrangement cycle (I×J) of a basic array pattern is different from an arrangement cycle (2×2) of a sharing configuration pattern which is made of the specific circuit element and the 2×2 pixels, and
- the basic array pattern includes at least one same-color square array pattern which is made of 2×2 color filters respectively arranged on the 2×2 pixels of the sharing configuration pattern, the 2×2 color filters having a same color, the method comprising:
- when a power supply of the image pickup apparatus is turned off, setting the photographic lens in a defocus state in the light irradiation state where the opening/closing device is opened, and detecting as sensitivity an output value of each pixel in the 2×2 pixels corresponding to the same-color square array pattern among the I×J pixels corresponding to the basic array pattern, putting the image pickup element in the light shielding state with the opening/closing device and detecting as a black level an output value of each pixel in the 2×2 pixels corresponding to the same-color square array pattern among the I×J pixels corresponding to the basic array pattern;
- storing information on the sensitivity of the 2×2 pixels corresponding to the same-color square array pattern and the black level in the storage device; and
- when the imaging instruction is inputted into the instruction input device, using the information stored in the storage device to correct a sensitivity difference between pixels in the I×J pixels corresponding to the basic array pattern.

25. A method for correcting a sensitivity difference for an image pickup element in an image pickup apparatus, including:
- the image pickup element configured such that a plurality of color filters are respectively arranged on a plurality of pixels including photoelectric conversion elements that are two-dimensionally arrayed in a horizontal direction and a vertical direction,
- a photographic lens configured to form incident object light as an object image,
- an instruction input device configured to receive an input of an imaging instruction, and a storage device configured to store information, wherein the plurality of pixels of the image pickup element share a specific circuit element in units of 2×2 pixels, wherein the plurality of color filters of the image pickup element are configured such that basic array patterns are repeatedly arranged in the horizontal direction and the vertical direction, each of the basic array patterns being made of I×J color filters (I represents a number in the horizontal direction while J represents a number in the vertical direction), the color filters of each of three or more colors being arrayed in a mixed state in each of the basic array patterns, wherein an arrangement cycle (I×J) of the basic array pattern is different from an arrangement cycle (2×2) of a sharing configuration pattern which is made of the specific circuit element and the 2×2 pixels, and the basic array pattern includes at least one same-color square array pattern which is made of 2×2 color filters respectively arranged on the 2×2 pixels of the sharing configuration pattern, the 2×2 color filters having a same color, the method comprising:

when an object is imaged with the image pickup element upon input of the imaging instruction, detecting as sensitivity at least an output value of each pixel in the 2×2 pixels corresponding to the same-color square array pattern among the I×J pixels corresponding to the basic array pattern, based on a picked-up image acquired by the image pickup element;

storing characteristic information on the sensitivity of the 2×2 pixels corresponding to the same-color square array pattern in the storage device; and at a time of next imaging, correcting a sensitivity difference between the pixels in the I×J pixels corresponding to the basic array pattern with use of the characteristic information on the 2×2 pixels corresponding to the same-color square array pattern stored in the storage device.

* * * * *